(12) United States Patent
Nishio

(10) Patent No.: US 10,025,683 B2
(45) Date of Patent: Jul. 17, 2018

(54) INFORMATION PROCESSING DEVICE AND COMPUTER-READABLE RECORDING MEDIUM

(71) Applicant: FUJITSU LIMITED, Kawasaki-shi, Kanagawa (JP)

(72) Inventor: Masahiro Nishio, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 75 days.

(21) Appl. No.: 15/166,327

(22) Filed: May 27, 2016

(65) Prior Publication Data

US 2016/0274984 A1    Sep. 22, 2016

Related U.S. Application Data

(63) Continuation of application No. PCT/JP2013/082404, filed on Dec. 2, 2013.

(51) Int. Cl.
*G06F 11/22* (2006.01)
*G06F 11/07* (2006.01)
(Continued)

(52) U.S. Cl.
CPC ........ *G06F 11/2284* (2013.01); *G06F 11/073* (2013.01); *G06F 11/0766* (2013.01);
(Continued)

(58) Field of Classification Search
CPC ............. G06F 11/2247; G06F 11/2289; G06F 11/2284; G06F 13/4068
See application file for complete search history.

(56) References Cited

U.S. PATENT DOCUMENTS

| 5,922,055 A * | 7/1999 | Shahar | ........ G06F 9/4411 710/16 |
| 6,625,680 B1 * | 9/2003 | Fronberg | ........ G06F 11/2247 710/10 |

(Continued)

FOREIGN PATENT DOCUMENTS

| JP | 61-162899 | 7/1986 |
| JP | 2002-259227 | 9/2002 |

(Continued)

OTHER PUBLICATIONS

International Search Report and Written Opinion of the International Searching Authority (Form PCT/ISA/210, Form PCT/ISA/237), dated in connection with PCT/JP2013/082404 and dated Feb. 25, 2014 (9 pages).

*Primary Examiner* — Yolanda L Wilson
(74) *Attorney, Agent, or Firm* — Fujitsu Patent Center

(57) ABSTRACT

It is an object to provide an information processing device and a computer-readable recording medium that enable achieving reduction in the man-hours of an operator. An information processing device comprises, a processor and a plurality of slots provided for installation of an electronic component. The processor that executes a process including; first detecting presence or absence of installation of the electronic component in each of the slots; second detecting, based on detection result obtained by the first detecting and based on an installation candidate pattern indicating presence or absence of installation of an electronic component in each of the slots as determined based on configuration of the information processing device, an installation defect of the electronic component; and notifying, when the installation defect is detected by the second detecting, the installation detect.

8 Claims, 23 Drawing Sheets

(51) Int. Cl.
*G06F 11/32* (2006.01)
*G06F 13/40* (2006.01)

(52) U.S. Cl.
CPC ...... *G06F 11/2247* (2013.01); *G06F 11/2289* (2013.01); *G06F 11/327* (2013.01); *G06F 13/4068* (2013.01)

(56) References Cited

U.S. PATENT DOCUMENTS

| | | | | |
|---|---|---|---|---|
| 2009/0157911 | A1* | 6/2009 | Aihara | G11C 16/10 710/17 |
| 2009/0254732 | A1* | 10/2009 | Dang | G06F 11/006 711/172 |
| 2012/0013346 | A1* | 1/2012 | Xu | G06F 11/221 324/543 |
| 2012/0096319 | A1* | 4/2012 | Wang | G06F 11/2284 714/45 |
| 2013/0054949 | A1* | 2/2013 | Berke | G11C 5/14 713/2 |

FOREIGN PATENT DOCUMENTS

| | | |
|---|---|---|
| JP | 2003-029998 | 1/2003 |
| JP | 2003-114739 | 4/2003 |
| JP | 2009-169940 | 7/2009 |

* cited by examiner

| CPU | MC | DIMM SLOT | DIMM INSTALLATION CANDIDATE PATTERN | | | | | | | |
|---|---|---|---|---|---|---|---|---|---|---|
| | | | 1-1 | 1-2 | 1-3 | 1-4 | 1-5 | 1-6 | 1-7 | 1-8 |
| 0 | 0A | 0A0 | x | x | x | x | | | | |
| | | 0A1 | | | x | x | | | | |
| | | 0A2 | | x | x | x | | | | |
| | | 0A3 | | | | x | | | | |
| | 0B | 0B0 | x | x | x | x | | | | |
| | | 0B1 | | | x | x | | | | |
| | | 0B2 | | x | x | x | | | | |
| | | 0B3 | | | | x | | | | |
| | 0C | 0C0 | x | x | x | x | | | | |
| | | 0C1 | | | x | x | | | | |
| | | 0C2 | | x | x | x | | | | |
| | | 0C3 | | | | x | | | | |
| | 0D | 0D0 | x | x | x | x | | | | |
| | | 0D1 | | | x | x | | | | |
| | | 0D2 | | x | x | x | | | | |
| | | 0D3 | | | | x | | | | |
| 1 | 1A | 1A0 | | | | | | | | |
| | | 1A1 | | | | | | | | |
| | | 1A2 | | | | | | | | |
| | | 1A3 | | | | | | | | |
| | 1B | 1B0 | | | | | | | | |
| | | 1B1 | | | | | | | | |
| | | 1B2 | | | | | | | | |
| | | 1B3 | | | | | | | | |
| | 1C | 1C0 | | | | | | | | |
| | | 1C1 | | | | | | | | |
| | | 1C2 | | | | | | | | |
| | | 1C3 | | | | | | | | |
| | 1D | 1D0 | | | | | | | | |
| | | 1D1 | | | | | | | | |
| | | 1D2 | | | | | | | | |
| | | 1D3 | | | | | | | | |

| CPU | MC | DIMM SLOT | DIMM INSTALLATION CANDIDATE PATTERN | | | | | | | |
|---|---|---|---|---|---|---|---|---|---|---|
| | | | 2-1 | 2-2 | 2-3 | 2-4 | 2-5 | 2-6 | 2-7 | 2-8 |
| 0 | 0A | 0A0 | x | x | | | | | | |
| | | 0A1 | | x | | | | | | |
| | | 0A2 | x | x | | | | | | |
| | | 0A3 | | x | | | | | | |
| | 0B | 0B0 | x | x | | | | | | |
| | | 0B1 | | x | | | | | | |
| | | 0B2 | x | x | | | | | | |
| | | 0B3 | | x | | | | | | |
| | 0C | 0C0 | x | x | | | | | | |
| | | 0C1 | | x | | | | | | |
| | | 0C2 | x | x | | | | | | |
| | | 0C3 | | x | | | | | | |
| | 0D | 0D0 | x | x | | | | | | |
| | | 0D1 | | x | | | | | | |
| | | 0D2 | x | x | | | | | | |
| | | 0D3 | | x | | | | | | |
| 1 | 1A | 1A0 | | | | | | | | |
| | | 1A1 | | | | | | | | |
| | | 1A2 | | | | | | | | |
| | | 1A3 | | | | | | | | |
| | 1B | 1B0 | | | | | | | | |
| | | 1B1 | | | | | | | | |
| | | 1B2 | | | | | | | | |
| | | 1B3 | | | | | | | | |
| | 1C | 1C0 | | | | | | | | |
| | | 1C1 | | | | | | | | |
| | | 1C2 | | | | | | | | |
| | | 1C3 | | | | | | | | |
| | 1D | 1D0 | | | | | | | | |
| | | 1D1 | | | | | | | | |
| | | 1D2 | | | | | | | | |
| | | 1D3 | | | | | | | | |

| CPU | MC | DIMM SLOT | DIMM INSTALLATION CANDIDATE PATTERN | | | | | | | |
|---|---|---|---|---|---|---|---|---|---|---|
| | | | 3-1 | 3-2 | 3-3 | 3-4 | 3-5 | 3-6 | 3-7 | 3-8 |
| 0 | 0A | 0A0 | x | x | | | | | | |
| | | 0A1 | | | | | | | | |
| | | 0A2 | | x | | | | | | |
| | | 0A3 | | | | | | | | |
| | 0B | 0B0 | x | x | | | | | | |
| | | 0B1 | | | | | | | | |
| | | 0B2 | | x | | | | | | |
| | | 0B3 | | | | | | | | |
| | 0C | 0C0 | x | x | | | | | | |
| | | 0C1 | | | | | | | | |
| | | 0C2 | | x | | | | | | |
| | | 0C3 | | | | | | | | |
| | 0D | 0D0 | x | x | | | | | | |
| | | 0D1 | | | | | | | | |
| | | 0D2 | | x | | | | | | |
| | | 0D3 | | | | | | | | |
| 1 | 1A | 1A0 | | | | | | | | |
| | | 1A1 | | | | | | | | |
| | | 1A2 | | | | | | | | |
| | | 1A3 | | | | | | | | |
| | 1B | 1B0 | | | | | | | | |
| | | 1B1 | | | | | | | | |
| | | 1B2 | | | | | | | | |
| | | 1B3 | | | | | | | | |
| | 1C | 1C0 | | | | | | | | |
| | | 1C1 | | | | | | | | |
| | | 1C2 | | | | | | | | |
| | | 1C3 | | | | | | | | |
| | 1D | 1D0 | | | | | | | | |
| | | 1D1 | | | | | | | | |
| | | 1D2 | | | | | | | | |
| | | 1D3 | | | | | | | | |

| CPU | MC | DIMM SLOT | DIMM INSTALLATION CANDIDATE PATTERN | | | | | | | |
|---|---|---|---|---|---|---|---|---|---|---|
| | | | 4-1 | 4-2 | 4-3 | 4-4 | 4-5 | 4-6 | 4-7 | 4-8 |
| 0 | 0A | 0A0 | x | | | | | | | |
| | | 0A1 | | | | | | | | |
| | | 0A2 | x | | | | | | | |
| | | 0A3 | | | | | | | | |
| | 0B | 0B0 | x | | | | | | | |
| | | 0B1 | | | | | | | | |
| | | 0B2 | x | | | | | | | |
| | | 0B3 | | | | | | | | |
| | 0C | 0C0 | x | | | | | | | |
| | | 0C1 | | | | | | | | |
| | | 0C2 | x | | | | | | | |
| | | 0C3 | | | | | | | | |
| | 0D | 0D0 | x | | | | | | | |
| | | 0D1 | | | | | | | | |
| | | 0D2 | x | | | | | | | |
| | | 0D3 | | | | | | | | |
| 1 | 1A | 1A0 | | | | | | | | |
| | | 1A1 | | | | | | | | |
| | | 1A2 | | | | | | | | |
| | | 1A3 | | | | | | | | |
| | 1B | 1B0 | | | | | | | | |
| | | 1B1 | | | | | | | | |
| | | 1B2 | | | | | | | | |
| | | 1B3 | | | | | | | | |
| | 1C | 1C0 | | | | | | | | |
| | | 1C1 | | | | | | | | |
| | | 1C2 | | | | | | | | |
| | | 1C3 | | | | | | | | |
| | 1D | 1D0 | | | | | | | | |
| | | 1D1 | | | | | | | | |
| | | 1D2 | | | | | | | | |
| | | 1D3 | | | | | | | | |

| CPU | MC | DIMM SLOT | DIMM INSTALLATION CANDIDATE PATTERN | | | | | | | |
|---|---|---|---|---|---|---|---|---|---|---|
| | | | 5-1 | 5-2 | 5-3 | 5-4 | 5-5 | 5-6 | 5-7 | 5-8 |
| 0 | 0A | 0A0 | x | x | x | x | x | x | x | |
| | | 0A1 | | | | x | x | x | x | |
| | | 0A2 | | x | x | x | x | x | x | |
| | | 0A3 | | | | | | x | x | |
| | 0B | 0B0 | x | x | x | x | x | x | x | |
| | | 0B1 | | | | x | x | x | x | |
| | | 0B2 | | x | x | x | x | x | x | |
| | | 0B3 | | | | | | x | x | |
| | 0C | 0C0 | x | x | x | x | x | x | x | |
| | | 0C1 | | | | x | x | x | x | |
| | | 0C2 | | x | x | x | x | x | x | |
| | | 0C3 | | | | | | x | x | |
| | 0D | 0D0 | x | x | x | x | x | x | x | |
| | | 0D1 | | | | x | x | x | x | |
| | | 0D2 | | x | x | x | x | x | x | |
| | | 0D3 | | | | | | x | x | |
| 1 | 1A | 1A0 | x | x | x | x | x | x | x | |
| | | 1A1 | | | | | x | x | x | |
| | | 1A2 | | | x | x | x | x | x | |
| | | 1A3 | | | | | | | x | |
| | 1B | 1B0 | x | x | x | x | x | x | x | |
| | | 1B1 | | | | | x | x | x | |
| | | 1B2 | | | x | x | x | x | x | |
| | | 1B3 | | | | | | | x | |
| | 1C | 1C0 | x | x | x | x | x | x | x | |
| | | 1C1 | | | | | x | x | x | |
| | | 1C2 | | | x | x | x | x | x | |
| | | 1C3 | | | | | | | x | |
| | 1D | 1D0 | x | x | x | x | x | x | x | |
| | | 1D1 | | | | | x | x | x | |
| | | 1D2 | | | x | x | x | x | x | |
| | | 1D3 | | | | | | | x | |

260

| CPU | MC | DIMM SLOT | DIMM INSTALLATION CANDIDATE PATTERN | | | | | | | |
|---|---|---|---|---|---|---|---|---|---|---|
| | | | 6-1 | 6-2 | 6-3 | 6-4 | 6-5 | 6-6 | 6-7 | 6-8 |
| 0 | 0A | 0A0 | x | x | x | x | | | | |
| | | 0A1 | | | x | x | | | | |
| | | 0A2 | | x | x | x | | | | |
| | | 0A3 | | | | x | | | | |
| | 0B | 0B0 | x | x | x | x | | | | |
| | | 0B1 | | | x | x | | | | |
| | | 0B2 | | x | x | x | | | | |
| | | 0B3 | | | | x | | | | |
| | 0C | 0C0 | x | x | x | x | | | | |
| | | 0C1 | | | x | x | | | | |
| | | 0C2 | | x | x | x | | | | |
| | | 0C3 | | | | x | | | | |
| | 0D | 0D0 | x | x | x | x | | | | |
| | | 0D1 | | | x | x | | | | |
| | | 0D2 | | x | x | x | | | | |
| | | 0D3 | | | | x | | | | |
| 1 | 1A | 1A0 | x | x | x | x | | | | |
| | | 1A1 | | | x | x | | | | |
| | | 1A2 | | x | x | x | | | | |
| | | 1A3 | | | | x | | | | |
| | 1B | 1B0 | x | x | x | x | | | | |
| | | 1B1 | | | x | x | | | | |
| | | 1B2 | | x | x | x | | | | |
| | | 1B3 | | | | x | | | | |
| | 1C | 1C0 | x | x | x | x | | | | |
| | | 1C1 | | | x | x | | | | |
| | | 1C2 | | x | x | x | | | | |
| | | 1C3 | | | | x | | | | |
| | 1D | 1D0 | x | x | x | x | | | | |
| | | 1D1 | | | x | x | | | | |
| | | 1D2 | | x | x | x | | | | |
| | | 1D3 | | | | x | | | | |

270

| CPU | MC | DIMM SLOT | DIMM INSTALLATION CANDIDATE PATTERN ||||||||
|---|---|---|---|---|---|---|---|---|---|---|
| | | | 7-1 | 7-2 | 7-3 | 7-4 | 7-5 | 7-6 | 7-7 | 7-8 |
| 0 | 0A | 0A0 | x | x | x | | | | | |
| | | 0A1 | | | | | | | | |
| | | 0A2 | | x | x | | | | | |
| | | 0A3 | | | | | | | | |
| | 0B | 0B0 | x | x | x | | | | | |
| | | 0B1 | | | | | | | | |
| | | 0B2 | | x | x | | | | | |
| | | 0B3 | | | | | | | | |
| | 0C | 0C0 | x | x | x | | | | | |
| | | 0C1 | | | | | | | | |
| | | 0C2 | | x | x | | | | | |
| | | 0C3 | | | | | | | | |
| | 0D | 0D0 | x | x | x | | | | | |
| | | 0D1 | | | | | | | | |
| | | 0D2 | | x | x | | | | | |
| | | 0D3 | | | | | | | | |
| 1 | 1A | 1A0 | x | x | x | | | | | |
| | | 1A1 | | | | | | | | |
| | | 1A2 | | | x | | | | | |
| | | 1A3 | | | | | | | | |
| | 1B | 1B0 | x | x | x | | | | | |
| | | 1B1 | | | | | | | | |
| | | 1B2 | | | x | | | | | |
| | | 1B3 | | | | | | | | |
| | 1C | 1C0 | x | x | x | | | | | |
| | | 1C1 | | | | | | | | |
| | | 1C2 | | | x | | | | | |
| | | 1C3 | | | | | | | | |
| | 1D | 1D0 | x | x | x | | | | | |
| | | 1D1 | | | | | | | | |
| | | 1D2 | | | x | | | | | |
| | | 1D3 | | | | | | | | |

| CPU | MC | DIMM SLOT | DIMM INSTALLATION CANDIDATE PATTERN ||||||||
|---|---|---|---|---|---|---|---|---|---|---|
| | | | 8-1 | 8-2 | 8-3 | 8-4 | 8-5 | 8-6 | 8-7 | 8-8 |
| 0 | 0A | 0A0 | x | x | | | | | | |
| | | 0A1 | | | | | | | | |
| | | 0A2 | | x | | | | | | |
| | | 0A3 | | | | | | | | |
| | 0B | 0B0 | x | x | | | | | | |
| | | 0B1 | | | | | | | | |
| | | 0B2 | | x | | | | | | |
| | | 0B3 | | | | | | | | |
| | 0C | 0C0 | x | x | | | | | | |
| | | 0C1 | | | | | | | | |
| | | 0C2 | | x | | | | | | |
| | | 0C3 | | | | | | | | |
| | 0D | 0D0 | x | x | | | | | | |
| | | 0D1 | | | | | | | | |
| | | 0D2 | | x | | | | | | |
| | | 0D3 | | | | | | | | |
| 1 | 1A | 1A0 | x | x | | | | | | |
| | | 1A1 | | | | | | | | |
| | | 1A2 | | x | | | | | | |
| | | 1A3 | | | | | | | | |
| | 1B | 1B0 | x | x | | | | | | |
| | | 1B1 | | | | | | | | |
| | | 1B2 | | x | | | | | | |
| | | 1B3 | | | | | | | | |
| | 1C | 1C0 | x | x | | | | | | |
| | | 1C1 | | | | | | | | |
| | | 1C2 | | x | | | | | | |
| | | 1C3 | | | | | | | | |
| | 1D | 1D0 | x | x | | | | | | |
| | | 1D1 | | | | | | | | |
| | | 1D2 | | x | | | | | | |
| | | 1D3 | | | | | | | | |

| CPU INSTALLATION COUNT (201) | DIMM INSTALLATION TYPE (202) | DIMM OPERATION MODE (203) | DIMM INSTALLATION MODE (204) |
|---|---|---|---|
| 1 | RDIMM | NON MIRROR | MODE #1 |
| | | MIRROR | MODE #2 |
| | UDIMM | NON MIRROR | MODE #3 |
| | | MIRROR | MODE #4 |
| 2 | RDIMM | NON MIRROR | MODE #5 |
| | | MIRROR | MODE #6 |
| | UDIMM | NON MIRROR | MODE #7 |
| | | MIRROR | MODE #8 |

| DIMM INSTALLATION STATE | LOGIC |
|---|---|
| INSTALLED | HIGH |
| NOT INSTALLED | LOW |

| PCI SWITCH INSTALLATION COUNT | PCI INSTALLATION TYPE | PCI OPERATION MODE | PCI INSTALLATION MODE |
|---|---|---|---|
| 1 | Gen2 | BUS MODE | MODE #1 |
| | | SEGMENT MODE | MODE #2 |
| | Gen3 | BUS MODE | MODE #3 |
| | | SEGMENT MODE | MODE #4 |
| 2 | Gen2 | BUS MODE | MODE #5 |
| | | SEGMENT MODE | MODE #6 |
| | Gen3 | BUS MODE | MODE #7 |
| | | SEGMENT MODE | MODE #8 |

INFORMATION PROCESSING DEVICE AND COMPUTER-READABLE RECORDING MEDIUM

CROSS-REFERENCE TO RELATED APPLICATION

This application is a continuation of International Application No. PCT/JP2013/082404, filed on Dec. 2, 2013, the entire contents of which are incorporated herein by reference.

FIELD

The embodiments discussed herein are related to an information processing device and a computer-readable recording medium.

BACKGROUND

With the development in server virtualization and cloud computing, there has been a demand for information processing devices installable with a large-capacity memory. In many of the information processing devices of recent years, in order to increase the memory capacity, slots are provided for installing a large number of dual inline memory modules (DIMMs). There are some information processing devices in which as many as 48 DIMMs can be installed on a single system board.

In an information processing device having a large number of DIMM slots, the DIMMs are installed in predetermined slots according to a DIMM installation candidate pattern, in which whether or not installation is possible is defined on a slot-by-slot basis. Depending on the combinations of the number of central processing units (CPUs), DIMM types, and DIMM operation modes in an information processing device; there are a number of DIMM installation candidate patterns available.

At the time of installing DIMMs in a decided pattern, following issues may arise. Primarily, a DIMM may get installed in an incorrect slot position, which may lead to incorrect installation of a DIMM in a no-installation-allowed slot. If there is such incorrect installation of DIMMs, a power-on self-test (POST) processing unit of the information processing device may detect a defect during DIMM diagnosis and bring the information processing device to a halt. The POST represents a hardware diagnosis test performed when an information processing device is powered ON and when hardware resetting is performed. The test program for implementing the POST is recorded in a basic input/output system read only memory (BIOSROM). Immediately after powering ON the device, the test program is executed so that the POST is performed.

Secondly, it is also possible to think of a case of installation inadequacy in which DIMMs are not installed in some of the decided slots. That includes a scenario of forgetting the installation and a scenario in which incomplete DIMM installation leads to poor connection thereby resulting in the appearance of no installation. In an identical manner to the case of incorrect installation, in the case of installation inadequacy too, the POST processing unit of the information processing device may detect a defect during DIMM diagnosis and bring the information processing device to a halt.

Meanwhile, conventional technologies are available for obtaining DIMM-related information. For example, a conventional technology is known in which the information stored in a serial presence detect (SPD), which is mounted in each DIMM, is read using a dedicated hardware interface and a dedicated system program; and DIMM-related information is checked. Herein, the SPD represents a type of a ROM chip mounted in a DIMM, and is used to store DIMM specification information such as the capacity, the maximum clock count, and the signal type of the DIMM. The information processing device decides on a DIMM control program according to the information obtained from the SPDs.

Moreover, a conventional technology is known in which a service processor reads the setting of configuration information of a processor, a memory device, and an input-output device; and displays the state of each device.

Japanese Laid-open Patent Publication No. 2002-259227
Japanese Laid-open Patent Publication No. 2003-029998

In the conventional technology for reading information from SPDs, a defect in an SPD can be detected using an application specific integrated circuit (ASIC). However, it is difficult to detect non-insertion or erroneous insertion of DIMMs. In the conventional technology for reading the setting using a service processor, the information on the memory is obtained from SPDs, and it is difficult to detect non-insertion or erroneous insertion of DIMMs.

In this way, in the conventional technology, a defect attributed to erroneous insertion or non-insertion of DIMMs is difficult to detect before booting the device. For that reason, the operator boots the device without noticing such a defect, which leads to malfunctioning of the device followed by a system crash. When a device stops working, it is common practice to perform the following three steps in order to restore the system. To begin with, using the displayed malfunction notification as a clue, the factors causing the failure in the device are investigated. Then, if a factor could be identified, the operator eliminates that factor. Lastly, the operator reboots the device and restores the system. In this way, since it is difficult to detect a defect such as erroneous insertion or non-insertion of DIMMs before booting the device, it leads to stopping the device and rebooting the device. That results in an increase in the man-hours of the operator while building the system and operating and maintaining the memory.

SUMMARY

According to an aspect of an embodiment, an information processing device includes: a processor and a plurality of slots provided for installation of an electronic component. The processor that executes a process including; first detecting presence or absence of installation of the electronic component in each of the slots; second detecting, based on detection result obtained by the first detecting and based on an installation candidate pattern indicating presence or absence of installation of an electronic component in each of the slots as determined based on configuration of the information processing device, an installation defect of the electronic component; and notifying, when the installation defect is detected by the second detecting, the installation detect.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating DIMM installation candidate patterns for a DIMM installation mode #2;

FIG. 6 is a diagram illustrating DIMM installation candidate patterns for a DIMM installation mode #3;

FIG. 7 is a diagram illustrating DIMM installation candidate patterns for a DIMM installation mode #4;

FIG. 8 is a diagram illustrating DIMM installation candidate patterns for a DIMM installation mode #5;

FIG. 11 is a diagram illustrating DIMM installation candidate patterns for a DIMM installation mode #8;

FIG. 12 is a diagram illustrating an example of a mode decision table;

DESCRIPTION OF EMBODIMENTS

Preferred embodiments of the present invention will be explained with reference to accompanying drawings. However, the information processing device and the computer-readable recording medium disclosed in the application concerned are not limited by the embodiments described herein.

[a] First Embodiment

Figure 1:
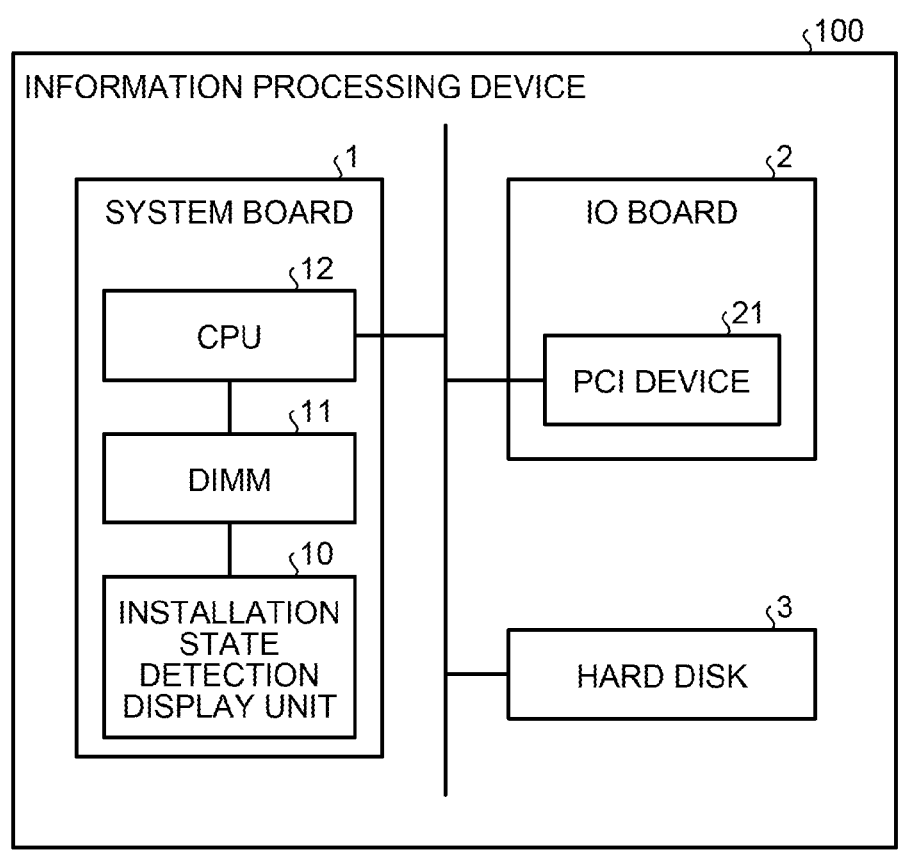
FIG. 1 is an overall configuration diagram of an information processing device according to a first embodiment.

FIG. 1 is an overall configuration diagram of an information processing device according to a first embodiment.

An information processing device 100 includes a system board 1 and an input-output (IO) board 2 that are removably insertable in nature. Herein, insertion of the system board 1 or the IO board 2 in the information processing device 100 is sometimes called installation in the information processing device 100. Meanwhile, the information processing device 100 also includes a hard disk 3.

The system board 1 includes a DIMM 11 functioning as the main memory medium and includes a CPU 12 functioning as a processing unit. Moreover, the system board 1 also includes an installation state detection display unit 10. The explanation about the installation state detection display unit 10 is given in detail later.

The CPU 12 and the DIMM 11 are detachably attachable to the system board 1. Herein, the number and the capability of the CPU 12 and the DIMM 11 is determined, for example, based on the system design of the operator of the information processing device 100; and the CPU 12 and the DIMM 11 are installed in the information processing device 100 by the operator.

The IO board 2 includes a PCI device 21, which is a network card or a graphic card, for example. Herein, the PCI device 21 is detachably attachable to the IO board 2.

Figure 2:
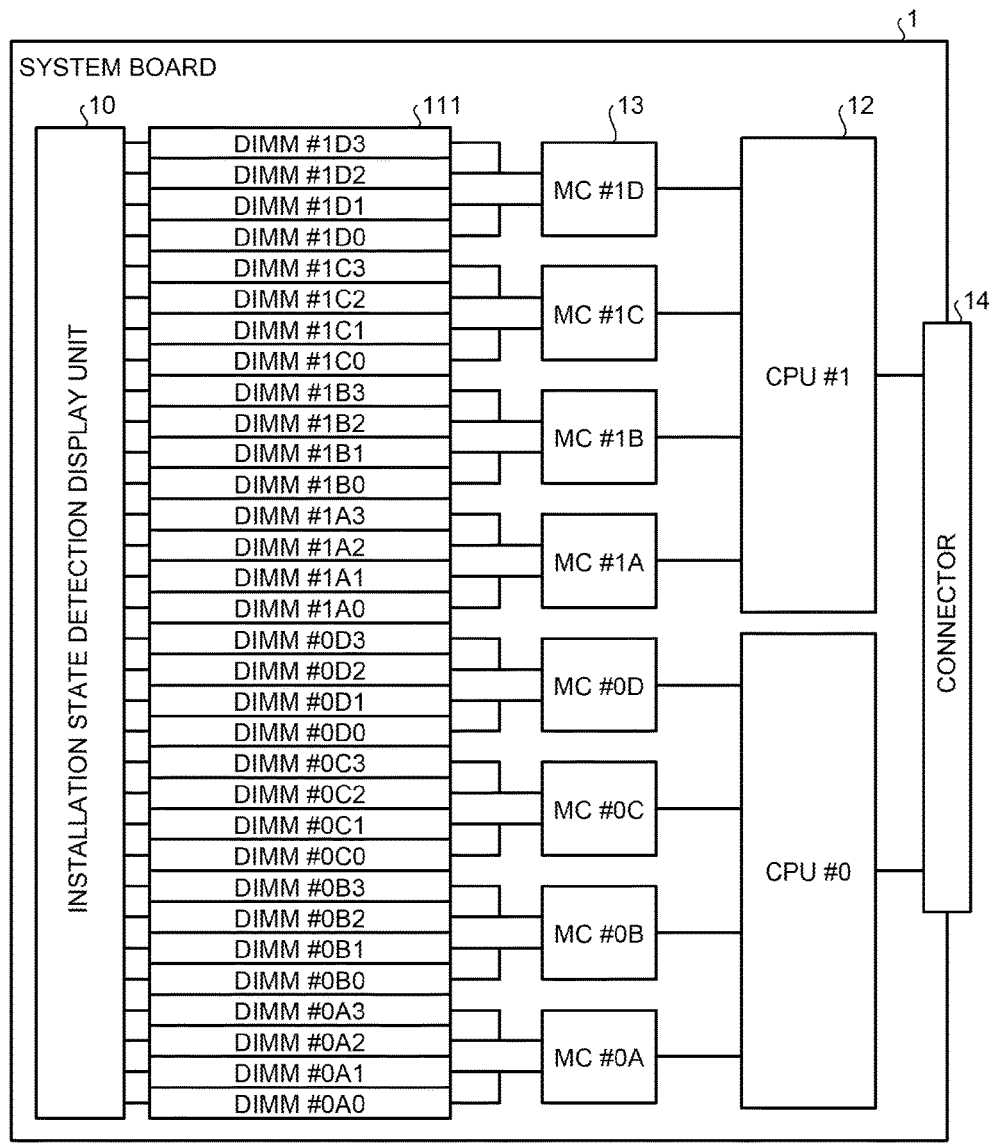
FIG. 2 is a configuration diagram of a system board according to the first embodiment.

FIG. 2 is a configuration diagram of the system board according to the first embodiment. In the first embodiment, the system board 1 includes 32 DIMM slots 111 in which the DIMMs 11 can be installed. In FIG. 2, each DIMM slot 111 is distinguished using a slot number. With reference to the DIMM slots 111 illustrated in FIG. 2, the numbers written after the term "DIMM" represent the slot numbers. Herein, the 32 DIMM slots 111 are expressed using the following slot numbers: #0A0 to #0A3, #0B0 to #0B3, #0C0 to #0C3, #0D0 to #0D3, #1A0 to #1A3, #1B0 to #1B3, #1C0 to #1C3, and #1D0 to #1D3. For example, the topmost DIMM slot 111 illustrated in FIG. 2 has the slot number #1D3.

Moreover, the system board 1 includes eight memory controllers (MCs) 13. In FIG. 2, each memory controller 13 too is distinguished using a controller number. With reference to the memory controllers 13 illustrated in FIG. 2, the numbers written after the term "MC" represent the controller numbers. Herein, the eight memory controllers 13 are expressed using the following controller numbers: #0A to #0D and #1A to #1D. For example, the topmost memory controller 13 illustrated in FIG. 2 has the controller number #1D.

Furthermore, the system board 1 includes two CPUs 12. In FIG. 2, each CPU 12 too is distinguished using a CPU number. With reference to the CPU 12 illustrated in FIG. 2, the numbers written after the term "CPU" represent the CPU numbers. In the first embodiment, a CPU #0 and a CPU #1 are installed.

Moreover, the system board 1 includes a connector 14, which enables establishing connection with a bus included in the information processing device 100.

The DIMM slots 111 are grouped into groups of four DIMM slots 111, and each group is connected to one memory controller 13. Moreover, the memory controllers 13 are grouped into groups of four memory controllers 13, and each group is connected to one CPU 12. Furthermore, the CPUs 12 are connected to the connector 14.

Meanwhile, in the system board 1, the installation state detection display unit 10 is connected to each DIMM slot 111.

Figure 3:
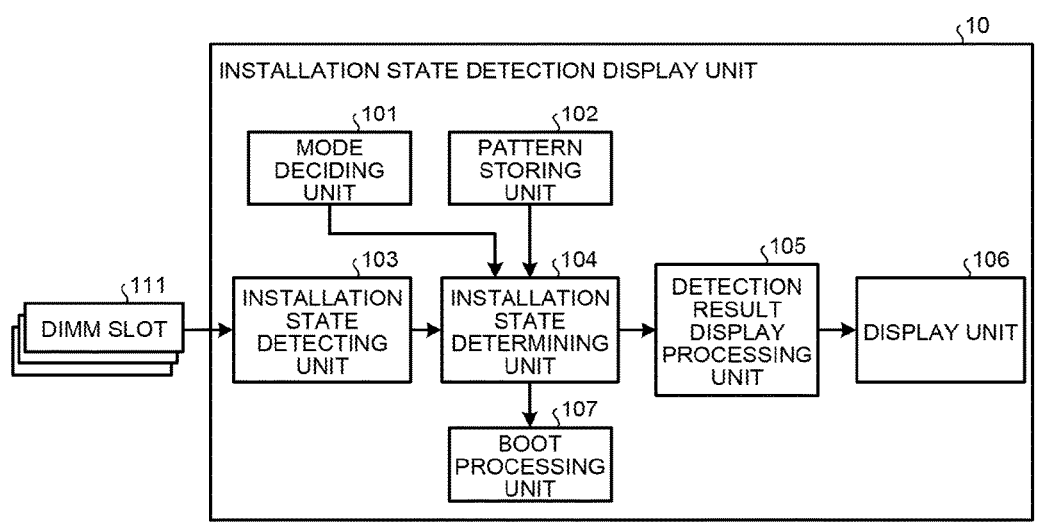
FIG. 3 is a block diagram illustrating an installation state detection display unit according to the first embodiment.

FIG. 3 is a block diagram illustrating the installation state detection display unit according to the first embodiment. The installation state detection display unit 10 includes a mode deciding unit 101, a pattern storing unit 102, an installation state detecting unit 103, an installation state determining unit 104, a detection result display processing unit 105, a display unit 106, and a boot processing unit 107.

In the DIMM slots 111, the DIMMs 11 are installed by the operator. Herein, the operator installs the DIMMs 11 in the DIMM slots 111 according to a pattern determined based on the installation count of the CPUs 12, the type of the DIMMs 11 to be installed, and the operation mode of the DIMMs 11 to be installed. However, when the DIMMs 11 are installed by the operator, there is a risk of incorrect installation or installation inadequacy occurring due to a mistake made by the operator.

The pattern storing unit 102 is used to store a DIMM installation candidate patterns for each DIMM installation mode. Herein, a DIMM installation mode represents identification information of the DIMM installation method that is decided in response to, for example, the installation count of the CPUs 12, the type of the DIMMs 11 to be installed, and the operation mode of the DIMMs 11 to be installed. Thus, in a DIMM installation candidate pattern, information indicating the possible arrangement of the DIMMs 11 in the DIMM slots 111 for each DIMM installation mode is registered.

Figure 4:
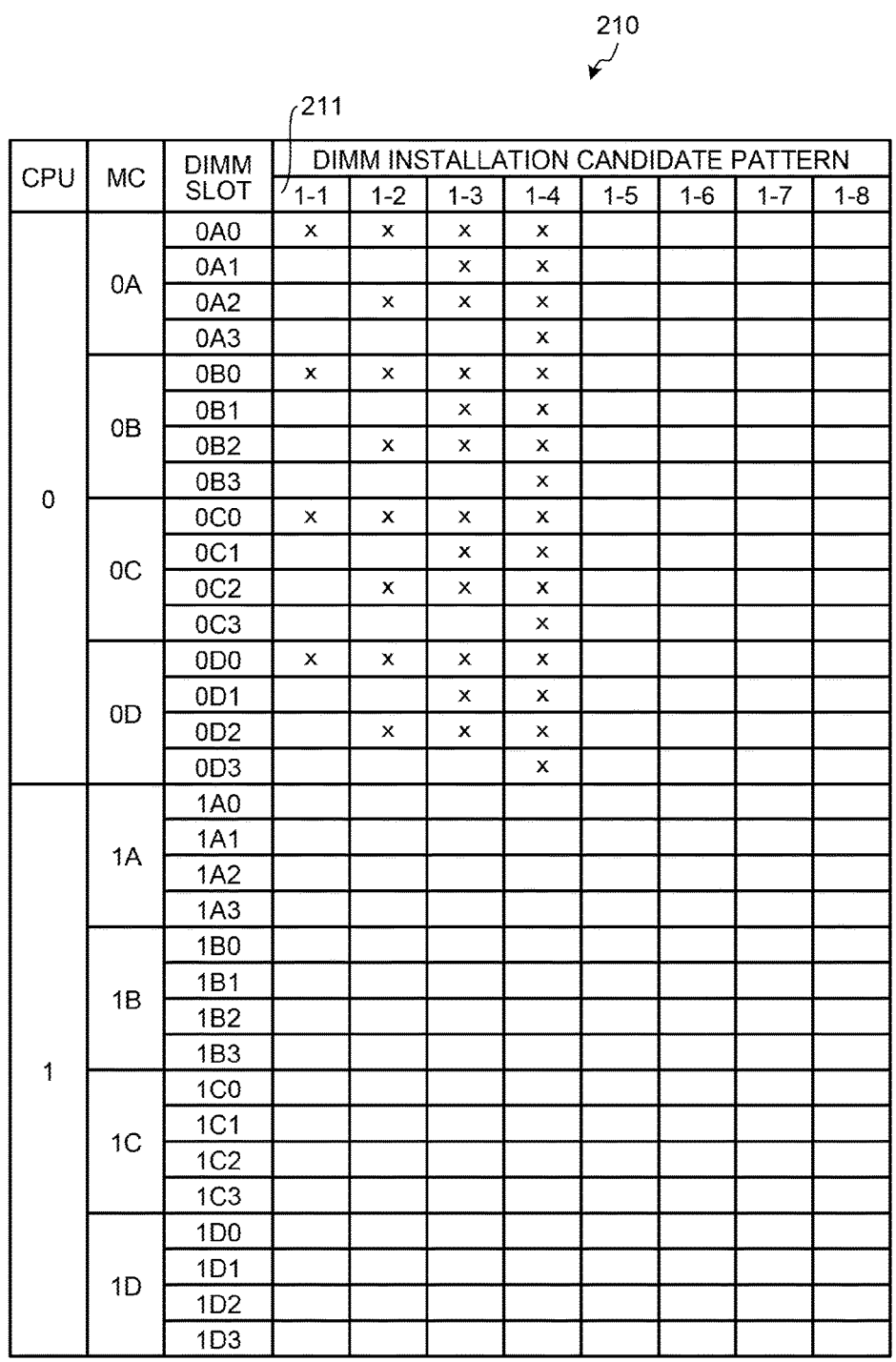
FIG. 4 is a diagram illustrating DIMM installation candidate patterns for a DIMM installation mode #1.
Figure 9:
FIG. 9 is a diagram illustrating DIMM installation candidate patterns for a DIMM installation mode #6.
Figure 10:
FIG. 10 is a diagram illustrating DIMM installation candidate patterns for a DIMM installation mode #7.

For example, in FIGS. 4 to 11 are illustrated examples of the DIMM installation candidate patterns stored for each DIMM installation mode in the pattern storing unit 102. Herein, the explanation is given for an example in which eight types of modes are used as the DIMM installation modes. In the following explanation, the eight types of DIMM installation modes are referred to by numbers #1 to #8. FIG. 4 is a diagram illustrating the DIMM installation candidate patterns for the DIMM installation mode #1. FIG. 5 is a diagram illustrating the DIMM installation candidate patterns for the DIMM installation mode #2. FIG. 6 is a diagram illustrating the DIMM installation candidate patterns for the DIMM installation mode #3. FIG. 7 is a diagram illustrating the DIMM installation candidate patterns for the DIMM installation mode #4. FIG. 8 is a diagram illustrating the DIMM installation candidate patterns for the DIMM installation mode #5. FIG. 9 is a diagram illustrating the DIMM installation candidate patterns for the DIMM installation mode #6. FIG. 10 is a diagram illustrating the DIMM installation candidate patterns for the DIMM installation mode #7. FIG. 11 is a diagram illustrating the DIMM installation candidate patterns for the DIMM installation mode #8. Thus, in the pattern storing unit 102, the DIMM installation candidate patterns illustrated in FIGS. 4 to 11 are stored in a corresponding manner to the DIMM installation modes #1 to #8.

Regarding the diagrams from FIGS. 4 to 9, the explanation is given with reference to FIG. 4, for example. With respect to the DIMM installation mode #1, four patterns represented by DIMM installation candidate patterns 1-1 to 1-4 are set. However, in the case of the DIMM installation mode #1, DIMM installation candidate patterns 1-5 to 1-8 are not set. For example, a column 211 in a table 210 illustrated in FIG. 4 represents the method of installation of the DIMMs 11 in DIMM slots 111 according to the DIMM installation candidate pattern 1-1. Among the fields of the column 211, the checked fields represent the DIMM slots 111 in which the DIMMs 11 are to be installed. That is, in the DIMM installation candidate pattern 1-1; the DIMM slot #0A0, the DIMM slot #0B0, the DIMM slot #0C, and the DIMM slot #0D0 represent the DIMM slots 111 in which the DIMMs 11 are to be installed.

As illustrated in FIGS. 5 to 9, regarding tables 220 to 280 corresponding to the other DIMM installation modes too, a plurality of DIMM installation candidate patterns is registered.

Returning to the explanation with reference to FIG. 3, the mode deciding unit 101 stores therein, for example, a mode decision table 200 illustrated in FIG. 12. Herein, FIG. 12 is a diagram illustrating an example of the mode decision table. In the mode decision table 200, DIMM installation mode 204 is registered in response to combinations of CPU installation count 201, DIMM installation type 202, and DIMM operation mode 203. For example, when the CPU installation count is "1", the CPU #1 illustrated in FIG. 2 is installed. The DIMM installation type 202 indicates whether the installed DIMM 11 is a registered (buffered) DIMM (RDIMM) including a buffer or an unbuffered DIMM (UDIMM) not including a buffer. The DIMM operation mode 203 indicates whether or not the operation mode of the DIMM 11 is "non mirror" mode having redundancy or "mirror" mode not having redundancy.

The mode deciding unit 101 receives, from the operator, input of the installation count of the CPU 12 in the information processing device 100, the type of the installed DIMMs 11, and the operation mode of the installed DIMMs 11. Then, the mode deciding unit 101 refers to the mode decision table 200, and decides on the DIMM installation mode 204 corresponding to the installation count of the CPU 12, the type of the installed DIMMs 11, and the operation mode of the DIMMs 11. Subsequently, the mode deciding unit 101 outputs the decided DIMM installation mode 204 to the installation state determining unit 104.

Figure 13:
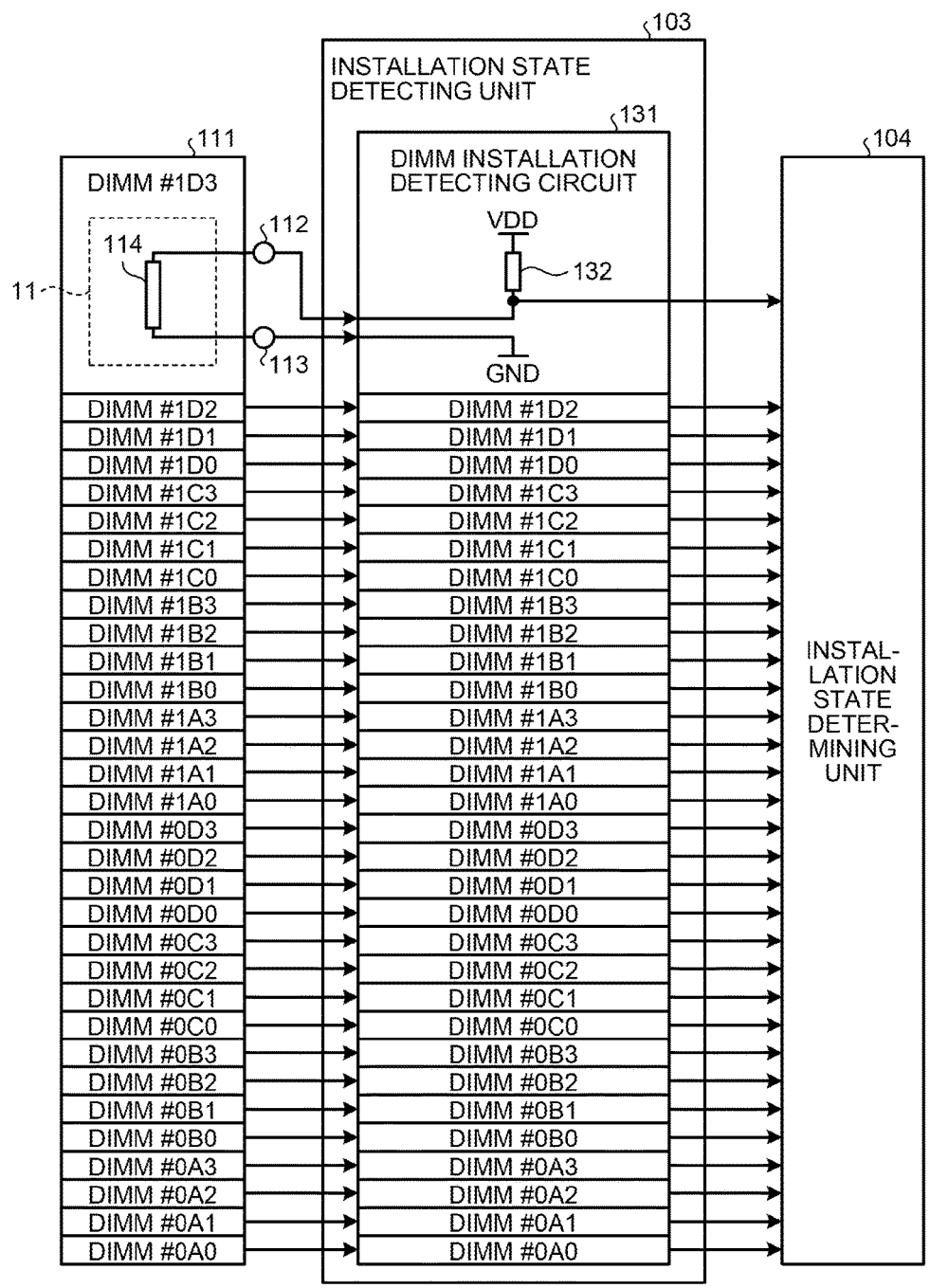
FIG. 13 is a diagram illustrating an example of a DIMM installation detecting circuit.

The installation state detecting unit 103 detects the DIMM slots 111 in which the DIMMs 11 are installed. For example, in the first embodiment, the installation state detecting unit 103 detects the installation state of the DIMMs 11 using a circuit illustrated in FIG. 13. Herein, FIG. 13 is a diagram illustrating an example of a DIMM installation detecting circuit.

Each DIMM slot 111 includes terminals 112 and 113. When the DIMM 11 is not inserted, the portion illustrated using dotted lines is removed so that the terminals 112 and 113 are not connected to each other. When the DIMM 11 is inserted in the DIMM slot 111, the terminals 112 and 113 get connected to each other as illustrated by the dotted lines. Meanwhile, the DIMM 11 includes an internal resistor 114 positioned in between the terminals 112 and 113.

The installation state detecting unit 103 includes a DIMM installation detecting circuit 131. Herein, the DIMM installation detecting circuit 131 includes a pull-up resistor 132 that is connected to a power-supply voltage on the side of the terminal 112 of the DIMM 11. Moreover, the DIMM installation detecting circuit 131 connects the terminal 113 of the DIMM 11 to the ground (GND).

When the terminals 112 and 113 are not connected to each other, the DIMM installation detecting circuit 131 outputs, to the installation state determining unit 104, a signal having a raised voltage attributed to the pull-up resistor 132, that is, a signal having "high" as the logic. In other words, when no DIMM 11 is inserted in the DIMM slot 111, the DIMM installation detecting circuit 131 outputs a "high" signal.

When the terminals 112 and 113 get connected to each other, the voltage falls to the ground. Hence, the DIMM installation detecting circuit 131 outputs a signal having "low" as the logic to the installation state determining unit 104. In other words, when the DIMM 11 is inserted in the DIMM slot 111, the DIMM installation detecting circuit 131 outputs a "low" signal.

Figures 14, 15:
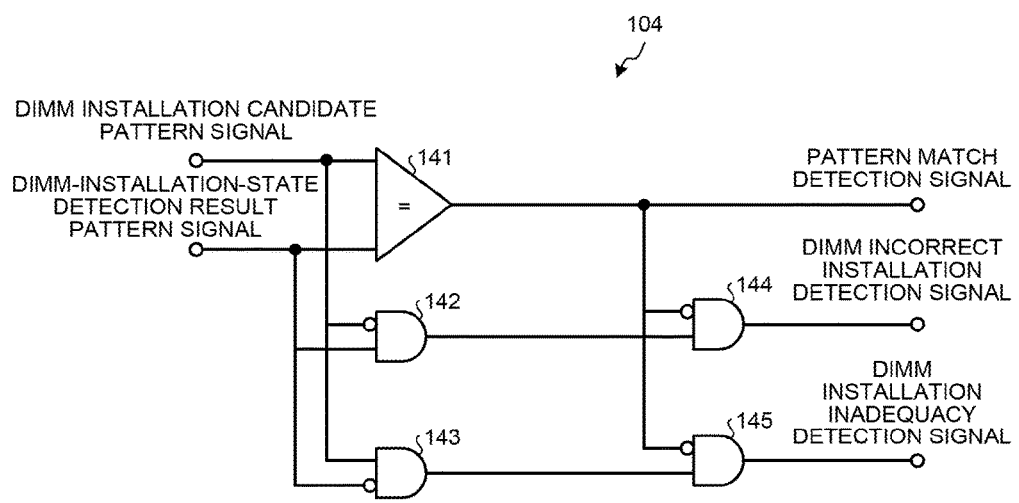
FIG. 14 is a diagram illustrating a logical table of the signals output by the DIMM installation detecting circuit.
FIG. 15 is a diagram illustrating an exemplary circuit configuration of an installation state determining unit.

FIG. 14 is a diagram illustrating a logical table of the signals output by the DIMM installation detecting circuit. When the DIMM 11 is installed in the DIMM slot 111, the DIMM installation detecting circuit 131 outputs a "high" signal. However, when no DIMM 11 is installed in the DIMM slot 111, the DIMM installation detecting circuit 131 outputs a "low" signal.

In FIG. 14, the DIMM slot 111 having the slot number #1D3 is illustrated as an example. However, with respect to the DIMM slots 111 having the other slot numbers too, the installation state detecting unit 103 includes the DIMM installation detecting circuit 131.

Thus, regarding each of the 32 DIMM slots 111, the DIMM installation detecting circuit 131 outputs a "low" signal when the corresponding DIMM 11 is installed and outputs a "high" signal when the corresponding DIMM 11 is not installed. Herein, if the "low" signal is expressed as "0" and if the "high" signal is expressed as "1", then the DIMM installation detecting circuit outputs, as the detection result of the installation states of the DIMMs 11, a bit string pattern in which a total of 32 "1" and "0" are arranged. For example, the DIMM installation detecting circuit 131 outputs a pattern "011101110111 . . . 0111" to the installation state determining unit 104.

The installation state determining unit 104 receives input of information about the decided DIMM installation mode from the mode deciding unit 101. Then, the installation state determining unit 104 obtains, from the pattern storing unit 102, the DIMM installation candidate patterns corresponding to the decided DIMM installation mode.

Moreover, the installation state determining unit 104 receives, from the installation state detecting unit 103, input of the detection result of the installation state of the DIMMs 11. Then, the installation state determining unit 104 compares the received detection result on the installation state with the obtained DIMM installation candidate patterns, and determines whether there is a matching pattern. If there is a matching pattern, then the installation state determining unit 104 outputs a pattern match detection signal to the detection result display processing unit 105. Moreover, the installation state determining unit 104 outputs a system boot permission signal to the boot processing unit 107.

On the other hand, if the received detection result on the installation state does not have a match with the obtained DIMM installation candidate patterns, the installation state determining unit 104 detects the DIMM slots 111 having incorrect installation or installation inadequacy. Then, the installation state determining unit 104 outputs, to the detection result display processing unit 105, information about the DIMM slots 111 having incorrect installation or installation inadequacy.

FIG. 15 is a diagram illustrating an exemplary circuit configuration of the installation state determining unit. In the first embodiment, the installation state determining unit 104 includes a comparator 141 and includes AND circuits 142 to 145.

The comparator 141 receives input of a DIMM installation candidate pattern signal and a DIMM-installation-state detection result pattern signal, which represents the pattern of the detection result of the DIMM installation state. A DIMM candidate pattern signal is a bit string pattern, in which a total of 32 "1" and "0" are arranged with "1" representing the DIMM slots 111 having the DIMMs 11 installed therein and "0" representing the DIMM slots 111 not having the DIMMs 11 installed therein, in each candidate pattern illustrated in FIGS. 4 to 11. Regarding the DIMM installation candidate pattern signal, the DIMM installation candidate patterns that correspond to the DIMM installation mode decided by the mode deciding unit 101 and that are stored in the pattern storing unit 102 is input in order.

The comparator 141 outputs "high" if a DIMM installation candidate pattern signal matches with the DIMM-installation-state detection result pattern signal. On the other hand, the comparator 141 outputs "low" if a DIMM installation candidate pattern signal does not match with the DIMM-installation-state detection result pattern signal. The output from the comparator 141 is then input to the detection result display processing unit 105 and to the AND circuits 144 and 145.

The AND circuit 142 receives input of a signal having the inverted logic of a DIMM installation candidate pattern signal and receives input of the DIMM-installation-state detection result pattern signal. If both the received signals are set to "high", the AND circuit 142 outputs a "high" signal. Otherwise, the AND circuit 142 outputs a "low" signal. That is, in case the DIMM 11 is actually installed in the DIMM slot 111 in which the DIMM 11 is not to be installed as per the DIMM installation candidate pattern, the AND circuit 142 outputs "high". In other words, when incorrect installation is detected, the AND circuit 142 outputs "high".

The AND circuit 143 receives input of a DIMM installation candidate pattern signal and a signal having the inverted logic of the DIMM-installation-state detection result pattern signal. If both the received signals are set to "high", the AND circuit 143 outputs a "high" signal. Otherwise, the AND circuit 143 outputs a "low" signal. That is, in case the DIMM 11 is actually not installed in the DIMM slot 111 in which the DIMM 11 is to be installed as per the DIMM installation candidate pattern, the AND circuit 143 outputs "high". In other words, when installation inadequacy is detected, the AND circuit 143 outputs "high".

The AND circuit 144 receives a signal having the inverted logic of the signal output from the comparator 141 and receives input of the signal output from the AND circuit 142. When the output from the comparator 141 is "high"; the AND circuit 144 outputs, to the detection result display processing unit 105, the "high" signal output from the AND circuit 142. That is, when the DIMM installation candidate pattern signal does not match with the DIMM-installation-state detection result pattern signal, the AND circuit 145 outputs a DIMM incorrect installation detection signal set to "high" to the detection result display processing unit 105. The DIMM incorrect installation detection signal represents a bit string pattern in which a total of 32 "0" and "1" are arranged.

The AND circuit 145 receives input of a signal having the inverted logic of the signal output from the comparator 141 and receives input of the signal output from the AND circuit 143. When the output from the comparator 141 is "high"; the AND circuit 145 outputs, to the detection result display processing unit 105, the "high" signal output from the AND circuit 142. That is, when the DIMM installation candidate pattern signal does not match with the DIMM-installation-state detection result pattern signal, the AND circuit 145 outputs a DIMM installation inadequacy detection signal set to "high" to the detection result display processing unit 105. The DIMM installation inadequacy detection signal also represents a bit string pattern in which a total of 32 "0" and "1" are arranged.

Meanwhile, the installation state determining unit 104 represents an example of a "defect detecting unit".

When a DIMM installation candidate pattern signal has an identical pattern to the pattern of the DIMM-installationstate detection result pattern signal, the detection result display processing unit 105 receives input of a pattern match detection signal from the installation state determining unit 104. For example, when 32 "high" signals are consecutively input after the start of comparison using a particular DIMM installation candidate pattern, the detection result display processing unit 105 can determine that a DIMM installation candidate pattern has been input.

Meanwhile, when the pattern of a DIMM installation candidate pattern signal is not identical to the pattern of the DIMM-installation-state detection result pattern signal; the detection result display processing unit 105 receives input, from the installation state determining unit 104, of either one or both of the signal indicating the DIMM slots 111 having incorrect installation and the signal indicating the DIMM slots 111 having installation inadequacy. The detection result display processing unit 105 receives, for each DIMM installation candidate pattern, input of the signals indicating the DIMM slots 111 having incorrect installation and installation inadequacy.

After the reception of information about incorrect installation or installation inadequacy regarding each DIMM installation candidate, if the input of a pattern match detection signal is received, the detection result display processing unit 105 deletes the information about incorrect installation and installation inadequacy in the previously-compared DIMM installation candidate pattern.

Meanwhile, if a pattern match detection signal is received for none of the DIMM installation candidate patterns, the detection result display processing unit 105 identifies the DIMM installation candidate pattern having the smallest number of total nonmatching portions. Then, the detection result display processing unit 105 displays, on the display unit 106, information indicating the DIMM slots 111 having incorrect installation and installation inadequacy in the identified DIMM installation candidate pattern.

Figure 16:
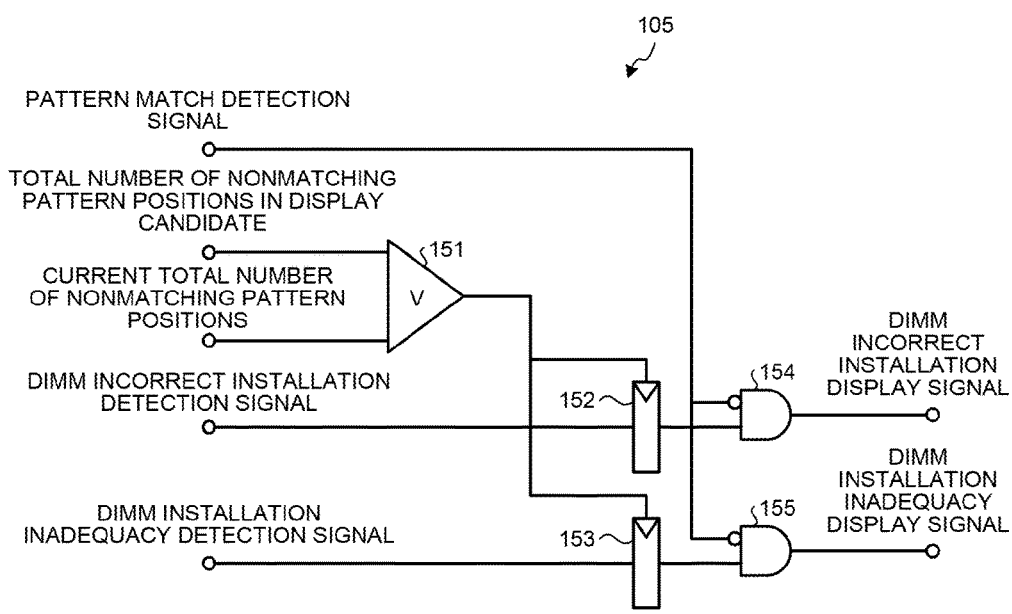
FIG. 16 is a diagram illustrating an exemplary circuit configuration of a detection result display processing unit.

FIG. 16 is a diagram illustrating an exemplary circuit configuration of the detection result display processing unit. In the first embodiment, the detection result display processing unit 105 includes a comparator 151, switches 152 and 153, and AND circuits 154 and 155. In FIG. 16, a circuit configuration is illustrated for the purpose of illustrating nonmatching DIMM slots 111 in the case of nonmatching patterns. In practice, when there is a match in patterns, the detection result display processing unit 105 clears the display. The following explanation is given about the operations performed in the case in which there is no match in patterns.

The comparator 151 sets the initially-compared DIMM installation candidate pattern as the display candidate.

Then, the comparator 151 receives input of the total number of nonmatching pattern portions in the DIMM installation candidate pattern that is set as the display candidate, and receives input of the current total number of nonmatching pattern portions in the currently-compared DIMM installation candidate pattern. Herein, when the current total number is greater than the total number of nonmatching portions in the display candidate, the comparator 151 inputs a "high" signal to the switches 152 and 153. Then, the comparator 151 sets the currently-compared DIMM installation candidate pattern as the display candidate.

On the other hand, if the current total number is equal to or smaller than the total number of nonmatching portions in the display candidate, the comparator 151 inputs a "low" signal to the switches 152 and 153.

The switch 152 receives input of the DIMM incorrect installation detection signal from the installation state determining unit 104. Then, if a "high" signal is received from the comparator 151, the switch 152 outputs the DIMM incorrect installation detection signal, which is received from the installation state determining unit 104, to the AND circuit 154. On the other hand, if a "low" signal is received from the comparator 151, the switch 152 outputs the "low" signal to the AND circuit 154.

The switch 153 receives input of a DIMM installation inadequacy detection signal from the installation state determining unit 104. Then, if a "high" signal is received from the comparator 151, the switch 153 outputs the DIMM installation inadequacy detection signal, which is received from the installation state determining unit 104, to the AND circuit 155. On the other hand, if a "low" signal is received from the comparator 151, the switch 153 outputs the "low" signal to the AND circuit 155.

The AND circuit 154 receives, from the installation state determining unit 104, input of a signal having the inverted logic of the pattern match detection signal. Moreover, if the total number of nonmatching portions in the currently-compared pattern is smaller than the total number of nonmatching portions in the display candidate, the AND circuit 154 receives input of the DIMM incorrect installation detection signal from the installation state determining unit 104. Then, if the pattern match detection signal is "low", that is, if the current DIMM installation candidate pattern does not match with the actual installation state of the DIMMs 11; the AND circuit 154 outputs, to the display unit 106, a DIMM incorrect installation display signal that includes the same bit string as the DIMM incorrect installation detection signal. Herein, a DIMM incorrect installation display signal is a bit string pattern in which a total of 32 "1" and "0" are arranged. Moreover, in a DIMM incorrect installation display signal, "1" represents the DIMM slots 111 having incorrect installation.

The AND circuit 155 receives, from the installation state determining unit 104, the input of a signal having the inverted logic of the pattern match detection signal. Moreover, if the total number of nonmatching portions in the currently-compared pattern is smaller than the total number of nonmatching portions in the display candidate, the AND circuit 155 receives input of the DIMM installation inadequacy detection signal from the installation state determining unit 104. Then, if the pattern match detection signal is "low", that is, if the current DIMM installation candidate pattern does not match with the actual installation state of the DIMMs 11; the AND circuit 155 outputs, to the display unit 106, a DIMM installation inadequacy display signal that includes the same bit string as the DIMM installation inadequacy detection signal. Herein, a DIMM installation inadequacy display signal is a bit string pattern in which a total of 32 "1" and "0" are arranged. Moreover, in a DIMM installation inadequacy display signal, "1" represents the DIMM slots 111 having installation inadequacy. Meanwhile, the detection result display processing unit 105 represents an example of a "notifying unit".

The display unit 106 receives input of a DIMM incorrect installation display signal and a DIMM installation inadequacy display signal from the detection result display processing unit 105. Then, the display unit 106 displays information about the DIMM slots 111 having incorrect installation as indicated by the DIMM incorrect installation display signal. Moreover, the display unit 106 displays information about the DIMM slots 111 having installation inadequacy as indicated by the DIMM installation inadequacy display signal. Given below is the explanation of an exemplary method by which the display unit 106 displays the DIMM slots 111 having incorrect installation and installation inadequacy.

Figure 17:
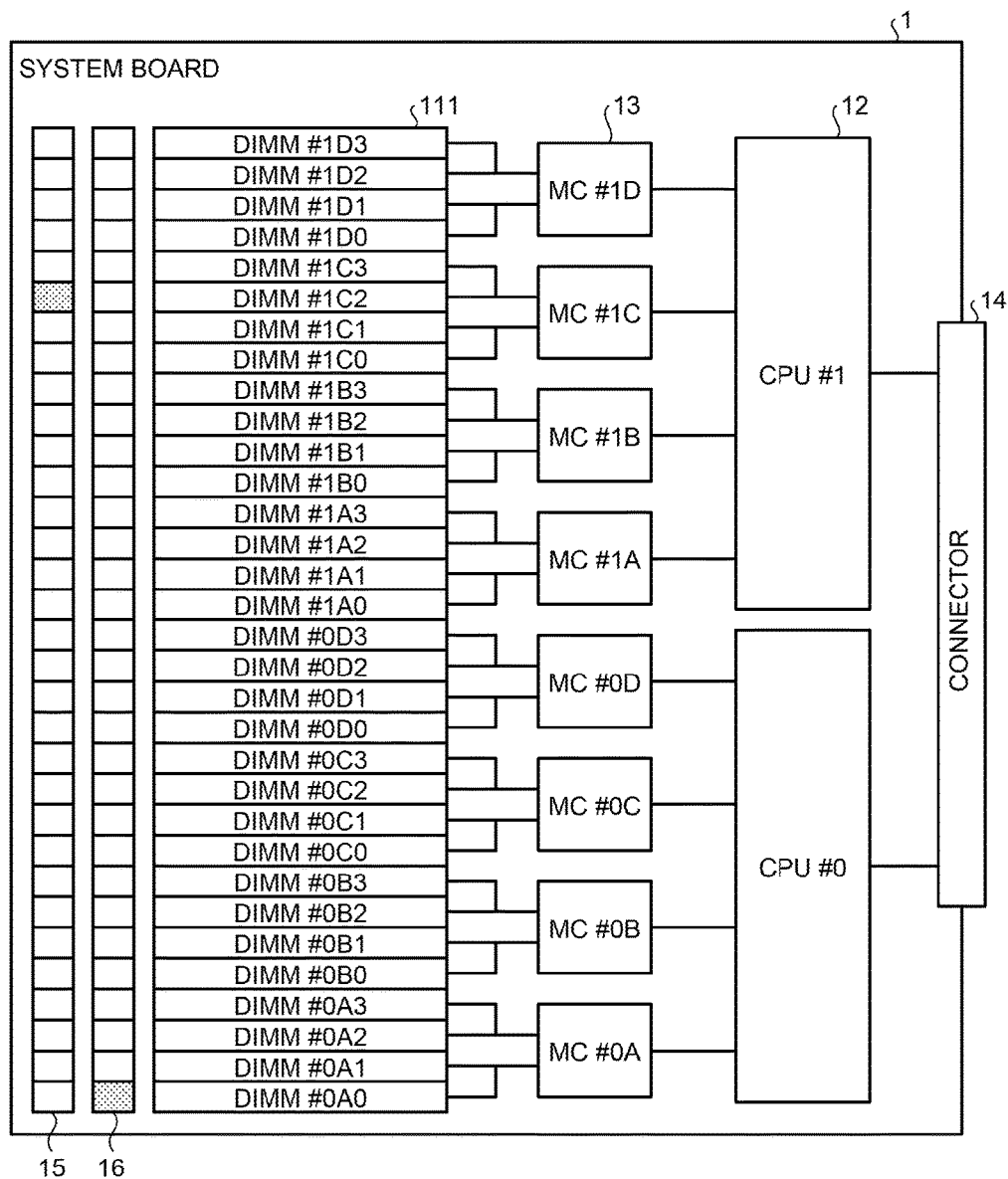
FIG. 17 is a diagram for explaining an example of a display unit.

In the first embodiment, the display unit 106 includes incorrect installation display LEDs 15 and installation inadequacy display LEDs 16 (LED stands for Light Emitting Diode) illustrated in FIG. 17. Herein, FIG. 17 is a diagram for explaining an example of the display unit. As illustrated in FIG. 17, 32 incorrect installation display LEDs 15 and 32 installation inadequacy display LEDs 16 are arranged on the system board 1 in a corresponding manner to the number of DIMM slots 111.

The incorrect installation display LEDs 15 are connected to, for example, the output terminal of the AND circuit 154 illustrated in FIG. 16. Thus, the incorrect installation display LEDs 15 receive the bit string pattern output from the AND circuit 154. Herein, starting from the leading end of the received pattern, one bit is input to each incorrect installation display LED 15 in order starting from the lowermost incorrect installation display LED 15 illustrated in FIG. 17. Then, the incorrect installation display LEDs 15 having the input value "1" light up, while the incorrect installation display LEDs 15 having the input value "0" go out. Thus, the operator understands that the DIMMs 11 are mistakenly installed in the DIMM slots 111 corresponding to the incorrect installation display LEDs 15 that are lighted. For example, in the state illustrated in FIG. 17, the operator can understand that the DIMM 11 is mistakenly installed in the DIMM slot 111 having the slot number #1C2.

The installation inadequacy display LEDs 16 are connected to, for example, the output terminal of the AND circuit 155 illustrated in FIG. 16. Thus, the installation inadequacy display LEDs 16 receive the bit string pattern output from the AND circuit 155. Herein, starting from the leading end of the received pattern, one bit is input to each installation inadequacy display LED 16 in order starting from the lowermost installation inadequacy display LED 16 illustrated in FIG. 17. Then, the installation inadequacy display LEDs 16 having the input value "1" light up, while the installation inadequacy display LEDs 16 having the input value "0" go out. Thus, the operator understands that the DIMMs 11 are not installed in the DIMM slots 111 corresponding to the installation inadequacy display LEDs 16 that are lighted. For example, in the state illustrated in FIG. 17, the operator can understand that the DIMM 11 is not installed in the DIMM slot 111 having the slot number #0A0.

Herein, on the display unit 106, the information on the DIMM slots 111 having incorrect installation and installation inadequacy is displayed using LEDs. However, as long as the operator is able to identify the DIMM slots 111 having incorrect installation and installation inadequacy, there is no particular restriction on the display method. For example, the display unit 106 can be treated as a monitor on which the information about the DIMM slots 111 having incorrect installation and installation inadequacy can be displayed.

Returning to the explanation with reference to FIG. 3, when the DIMMs 11 are installed according to a DIMM installation candidate pattern, the boot processing unit 107 receives a system boot permission signal from the installation state determining unit 104. Then, the boot processing unit 107 boots the system of the information processing device 100. On the other hand, if the DIMMs 11 are not installed according to a DIMM installation candidate pattern, a system boot permission signal is not received. Hence, the boot processing unit 107 does not the boot the system. Herein, the functions of the boot processing unit 107 are implemented by the CPU 12.

Figure 18:
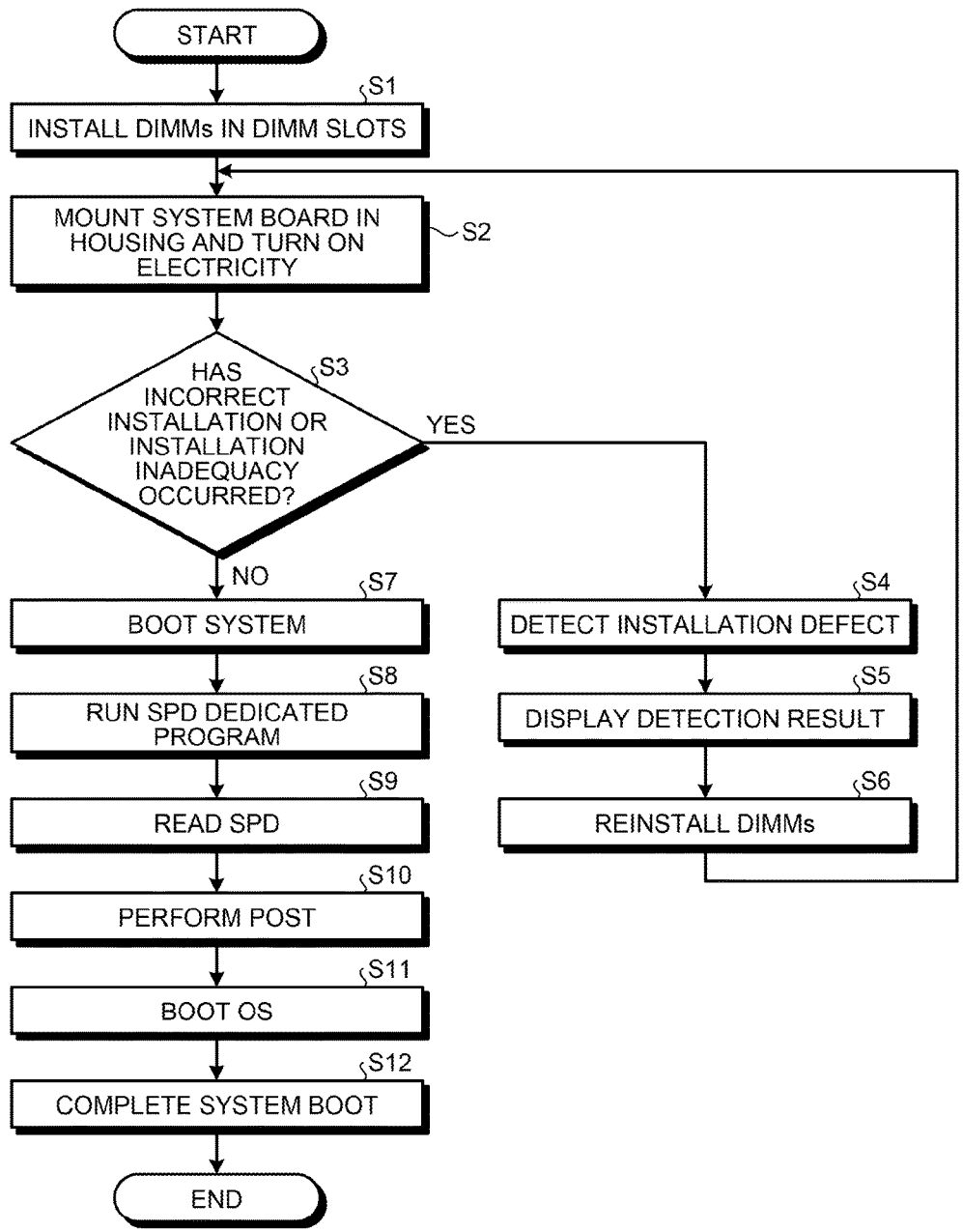
FIG. 18 is a flowchart for explaining an operation of determining incorrect installation and installation inadequacy of DIMMs as performed by the information processing device according to the first embodiment.

Explained below with reference to FIG. 18 is an overall sequence of operations performed by the information processing device 100 according to the first embodiment during an operation of determining incorrect installation and installation inadequacy of the DIMMs 11. FIG. 18 is a flowchart for explaining an operation of determining incorrect installation and installation inadequacy of the DIMMs as performed by the information processing device according to the first embodiment.

The operator installs the DIMMs 11 in the DIMM slots 111 (Step S1).

Moreover, the operator mounts the system board 1, in which the DIMMs 11 are installed, in the housing of the information processing device 100; and turns on electricity to the system board 1 (Step S2).

The information processing device 100 determines whether or not there is no incorrect installation or installation inadequacy of the DIMMs 11 in the DIMM slots 111 (Step S3). If incorrect installation or installation inadequacy has occurred (Yes at Step S3), the information processing device 100 detects an installation defect (Step S4).

Subsequently, the information processing device 100 displays the detection result about the DIMM slots 111 having incorrect installation and installation inadequacy (Step S5).

The operator confirms the display of the detection result about the DIMM slots 111 having incorrect installation and installation inadequacy, and reinstalls the DIMMs 11 (Step S6). Then, the system control returns to Step S2.

However, when neither incorrect installation nor installation inadequacy has occurred, that is, when the DIMMs 11 are properly installed according to a DIMM installation candidate pattern (No at Step S3); the information processing device 100 boots the system (Step S7).

Then, the information processing device 100 runs an SPD dedicated program (Step S8).

Subsequently, the information processing device 100 reads the SPD from the DIMMs 11 using the SPD dedicated program that is running (Step S9).

Then, the information processing device 100 executes the POST (Step S10).

If no error is detected in the POST, then the information processing device 100 boots the operating system (OS) (Step S11).

Then, the information processing device 100 completes the system boot (Step S12).

Figure 19:
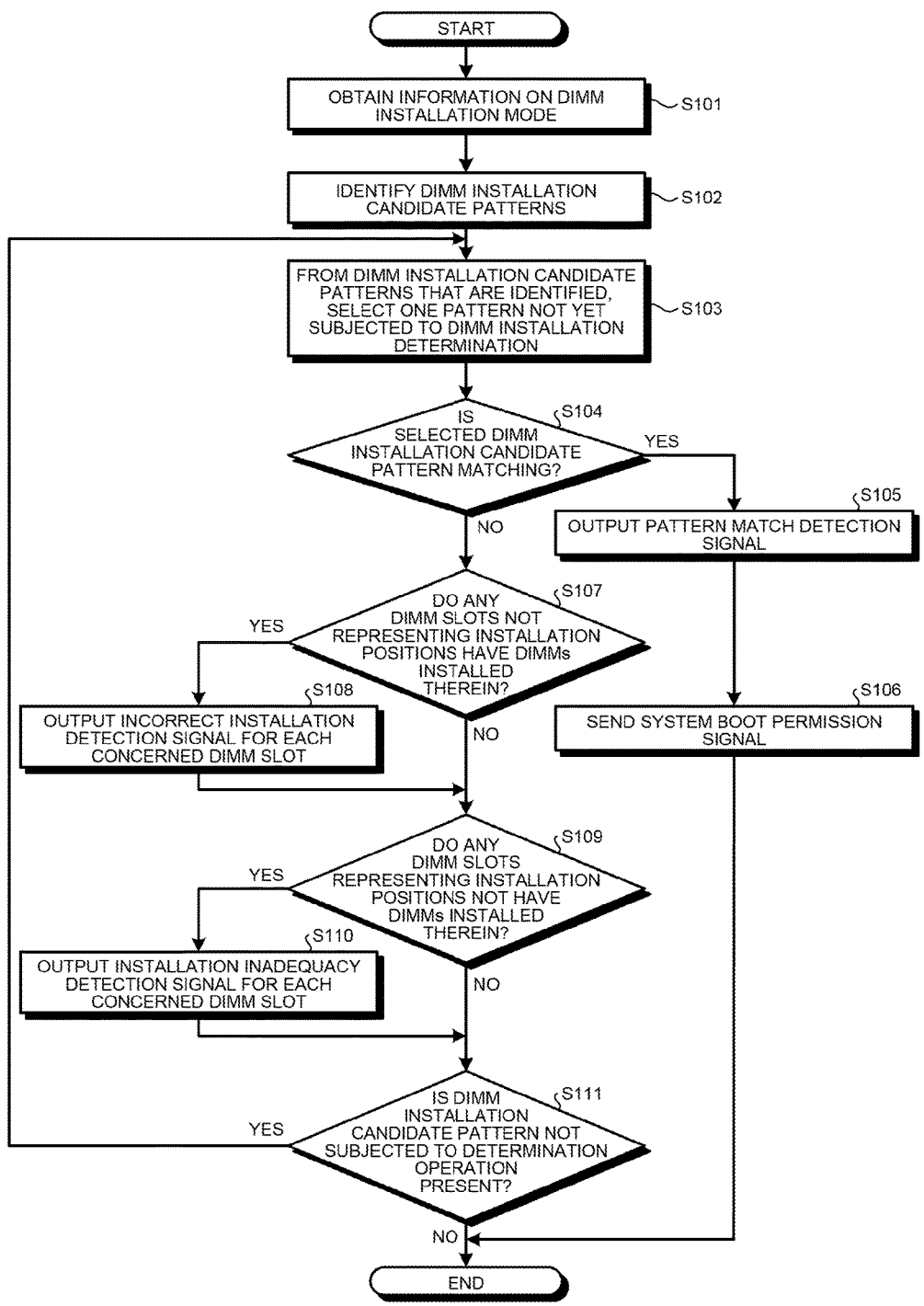
FIG. 19 is a flowchart for explaining an installation state determination operation for DIMMs as performed by the installation state determining unit.

Explained below with reference to FIG. 19 is a sequence of operations performed by the installation state determining unit 104 during an installation state determination operation for the DIMMs 11. FIG. 19 is a flowchart for explaining the installation state determination operation for the DIMMs as performed by the installation state determining unit. The flowchart illustrated in FIG. 19 corresponds to the operation at Step S3 illustrated in FIG. 18.

The installation state determining unit 104 obtains information about the DIMM installation mode from the mode deciding unit 101 (Step S101).

Then, from among the DIMM installation candidate patterns stored in the pattern storing unit 102, the installation state determining unit 104 identifies the DIMM installation candidate patterns corresponding to the obtained DIMM installation mode (Step S102).

The installation state determining unit 104 selects, from among the identified DIMM installation candidate patterns, a single DIMM installation candidate pattern that is not yet subjected to DIMM installation determination (Step S103).

Then, the installation state determining unit 104 determines whether or not the selected DIMM installation candidate pattern matches with the actual installation state of the DIMMs 11 in the DIMM slots 111 (Step S104). If there is a match in patterns (Yes at Step S104), then the installation state determining unit 104 outputs a pattern match detection signal to the detection result display processing unit 105 (Step S105).

Moreover, the installation state determining unit 104 sends a system boot permission signal to the boot processing unit 107 (Step S106). It marks the end of the installation state determination operation performed by the installation state determining unit 104.

Meanwhile, if there is no match in patterns (No at Step S104), the installation state determining unit 104 determines whether or not the DIMM slots 111 which do not represent the installation positions in the selected DIMM installation candidate pattern have the DIMMs 11 installed therein (Step S107). If there is no incorrect installation (No at Step S107), then the installation state determining unit 104 proceeds to Step S109.

On the other hand, if there is incorrect installation (Yes at Step S107), then the installation state determining unit 104 outputs an incorrect installation detection signal for each concerned DIMM slot 111 (Step S108).

Subsequently, the installation state determining unit 104 determines whether or not any of the DIMM slots 111 representing the installation positions in the selected DIMM installation candidate pattern do not have the DIMMs 11 installed therein (Step S109). If there is no DIMM slot 111 without installation (No at Step S109), then the system control proceeds to Step S111.

When there are DIMM slots 111 having no installation (Yes at Step S109), the installation state determining unit 104 outputs an installation inadequacy detection signal for each concerned DIMM slot 111 (Step S110).

Subsequently, the installation state determining unit 104 determines whether or not there is any DIMM installation candidate pattern that is not yet subjected to the determination operation (Step S111). If there is any DIMM installation candidate pattern that is not yet subjected to the determination operation (Yes at Step S111), then the system control returns to Step S103.

On the other hand, if there is no DIMM installation candidate pattern that is not yet subjected to the determination operation (No at Step S111), it marks the end of the installation state determination operation performed by the installation state determining unit 104.

Figure 20:
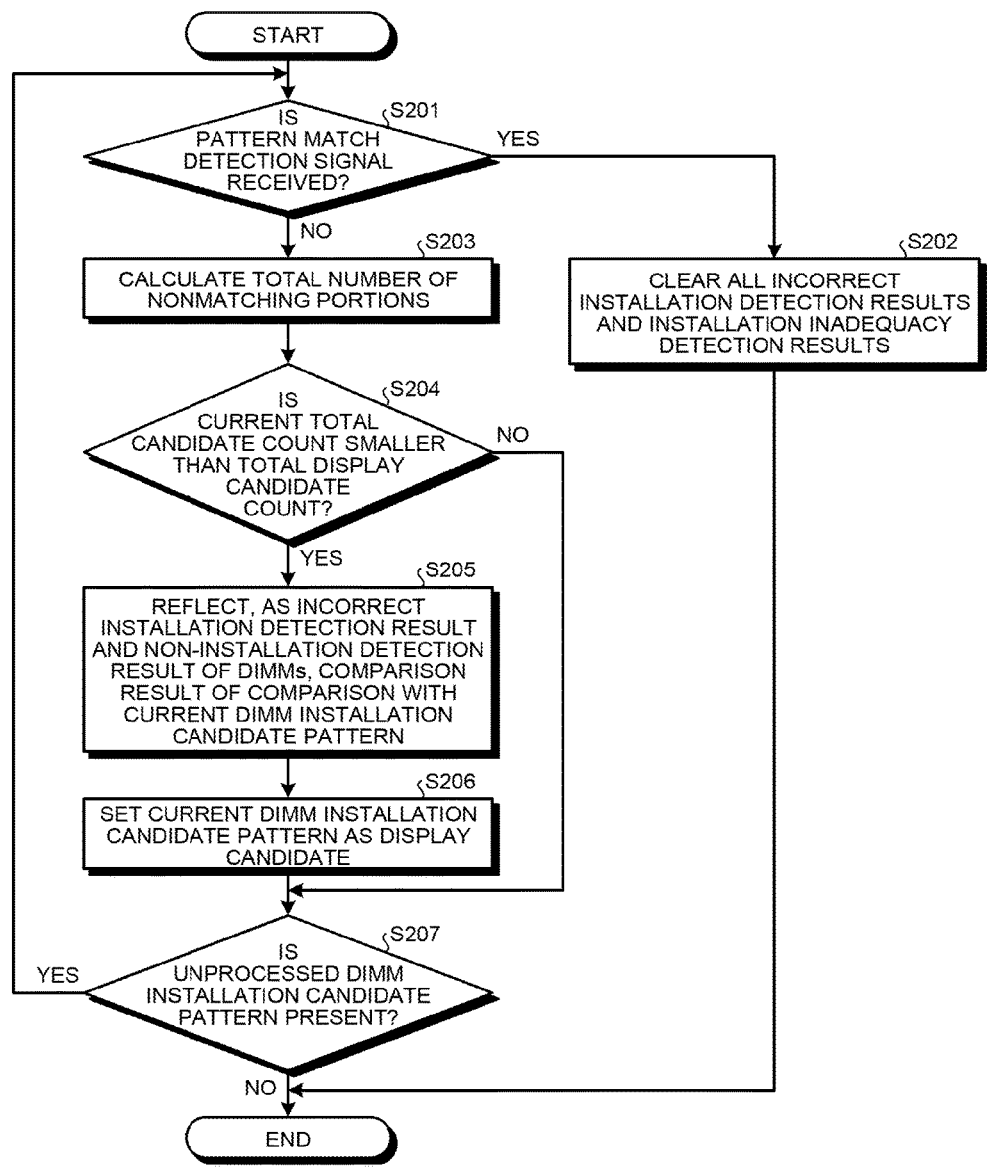
FIG. 20 is a flowchart for explaining a detection result display operation performed by the detection result display processing unit according to the first embodiment.

Explained below with reference to FIG. 20 is a flow of operations during a detection result display operation performed by the detection result display processing unit 105. FIG. 20 is a flowchart for explaining the detection result display operation performed by the detection result display processing unit according to the first embodiment. The flowchart illustrated in FIG. 20 corresponds to the operation at Step S5 illustrated in FIG. 8.

The detection result display processing unit 105 determines whether or not a pattern match detection signal is received (Step S201). When a pattern match detection signal is received (Yes at Step S201), the detection result display processing unit 105 clears all incorrect installation detection results and installation inadequacy detection results (Step S202). It marks the end of the detection result display operation performed by the detection result display processing unit 105.

On the other hand, if a pattern match detection signal is not received (No at Step S201), then the detection result display processing unit 105 calculates a current total candidate count that represents the total number of nonmatching portions between the current DIMM installation candidate pattern and the actual installation state of the DIMMs 11 (Step S203).

Then, the detection result display processing unit 105 determines whether or not the current total candidate count is smaller than a total display candidate count that represents the total number of nonmatching portions between the DIMM installation candidate pattern set as the display candidate and the actual installation state of the DIMMs 11 (Step S204). If the current total candidate count is equal to or greater than the total display candidate count (No at Step S204), then the system control proceeds to Step S207.

On the other hand, if the current total candidate count is smaller than the total display candidate count (Yes at Step S204), then the detection result display processing unit 105 reflects, as an incorrect installation detection result and a non-installation detection result of DIMMs, the comparison result of comparison between the current installation state of the DIMMs 11 and the current DIMM installation candidate pattern (Step S205) and displays the result on the display unit 106. However, if the current DIMM installation candidate pattern is the first DIMM installation candidate pattern, then it is difficult for the detection result display processing unit 105 to perform any comparison. Hence, the system control proceeds to Step S205 without any comparison.

Then, the detection result display processing unit 105 sets the current DIMM installation candidate pattern as the display candidate (Step S206).

The detection result display processing unit 105 determines whether or not there is a DIMM installation candidate pattern that is not yet subjected to display determination (Step S207). If there is a DIMM installation candidate pattern that is not yet subjected to display determination (Yes at Step S207), then the system control returns to Step S201.

On the other hand, when there is no DIMM installation candidate pattern that is not yet subjected to display determination (No at Step S207), it marks the end of the detection result display operation performed by the detection result display processing unit 105.

As described above, the information processing device according to the first embodiment detects incorrect installation and installation inadequacy of DIMMs before the booting of the system and displays the detection result as a notification to the operator. As a result, the operator can promptly find incorrect installation and installation inadequacy of DIMMs, and thus can avoid the termination and rebooting of the system attributed to incorrect installation and installation inadequacy of DIMMs. That enables achieving reduction in the man-hours of the operator while building the system and operating and maintaining the memory until the device is booted normally.

[b] Second Embodiment

Given below is the explanation of a second embodiment. In an information processing device according to the second embodiment, the method of selecting a DIMM installation candidate pattern, which is used in displaying the detection result of incorrect installation and installation inadequacy of DIMMs, is different than the first embodiment. Regarding the information processing device according to the second embodiment too, the constituent elements are as illustrated in the block diagram in FIG. 3. Hereinafter, the constituent elements having the same functions as the first embodiment are not explained in a repeated manner.

Figure 21:
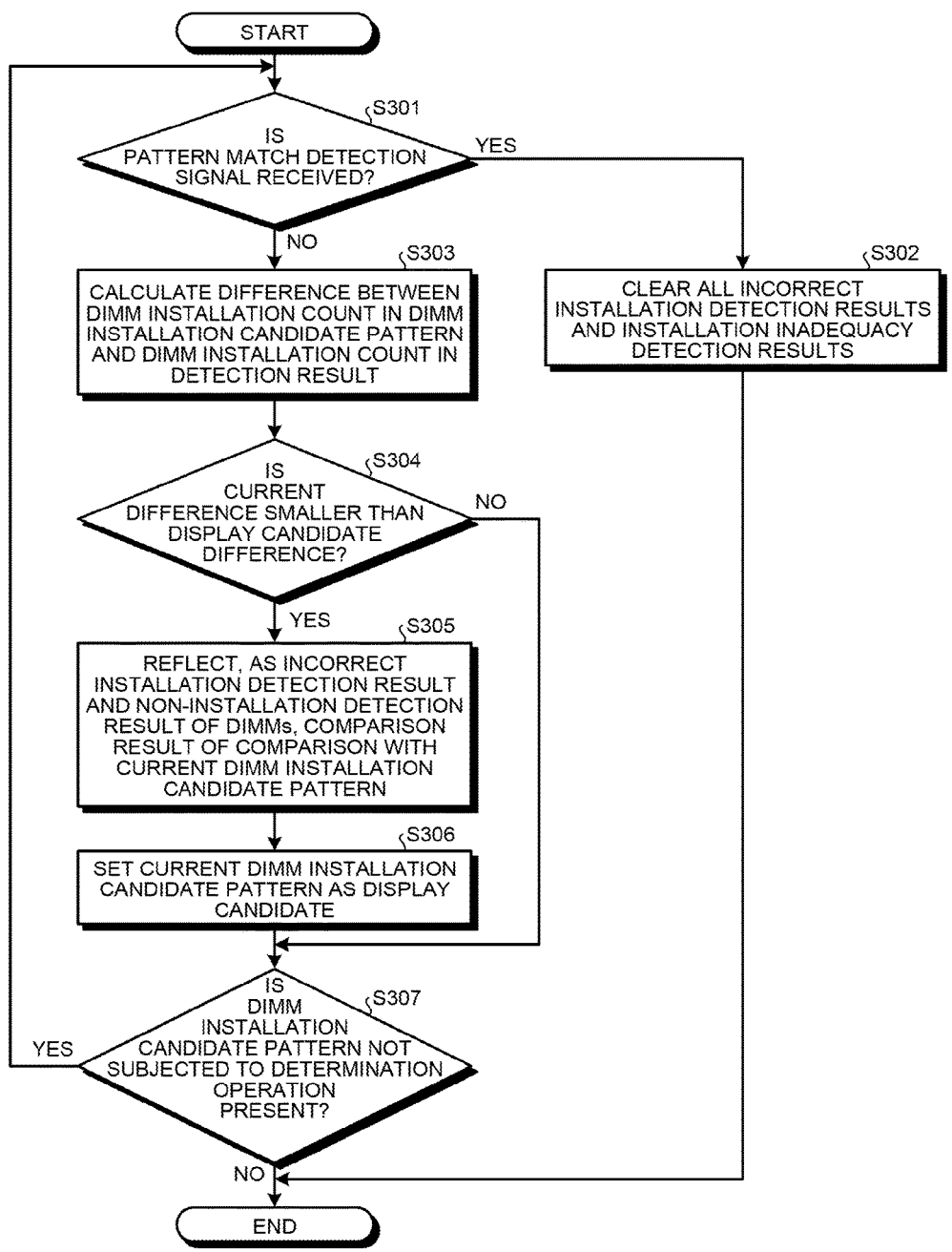
FIG. 21 is a flowchart for explaining a detection result display operation performed by the detection result display processing unit according to a second embodiment.

Explained with reference to FIG. 21 is a detection result determination operation performed by the detection result display processing unit 105 according to the second embodiment. FIG. 21 is a flowchart for explaining a detection result display operation performed by the detection result display processing unit according to the second embodiment.

The detection result display processing unit 105 determines whether or not a pattern match detection signal is received (Step S301). If a pattern match detection signal is received (Yes at Step S301), then the detection result display processing unit 105 clears all incorrect installation detection results and installation inadequacy detection results (Step S302). It marks the end of the detection result display operation performed by the detection result display processing unit 105.

On the other hand, if a pattern match detection signal is not received (No at Step S301), then the detection result display processing unit 105 calculates a current difference representing the difference between the DIMM installation count in the current DIMM installation candidate pattern and the actual installation count of the DIMMs 11 (Step S303).

Then, the detection result display processing unit 105 determines whether or not the current difference is smaller than a display candidate difference that represents the difference between the DIMM installation count in the DIMM installation candidate pattern set as the display candidate and the actual installation count of the DIMMs 11 (Step S304). If the current difference is equal to or greater than the display candidate difference (No at Step S304), then the system control proceeds to Step S306.

On the other hand, when the current difference is smaller than the display candidate difference (Yes at Step S304), then the detection result display processing unit 105 reflects, as an incorrect installation detection result and a non-installation detection result of DIMMs, the comparison result of comparison between the current installation state of the DIMMs 11 and the current DIMM installation candidate pattern (Step S305) and displays the result on the display unit 106. However, if the current DIMM installation candidate pattern is the first DIMM installation candidate pattern, it is difficult for then the detection result display processing unit 105 to perform any comparison. Hence, the system control proceeds to Step S305 without any comparison.

Then, the detection result display processing unit 105 sets the current DIMM installation candidate pattern as the display candidate (Step S306).

The detection result display processing unit 105 determines whether or not there is a DIMM installation candidate pattern that is not yet subjected to display determination (Step S307). If there is a DIMM installation candidate pattern that is not yet subjected to display determination (Yes at Step S307), then the system control returns to Step S301.

When there is no DIMM installation candidate pattern that is not yet subjected to display determination (No at Step S307), it marks the end of the detection result display operation performed by the detection result display processing unit 105.

As described above, the information processing device according to the second embodiment displays the comparison result of comparison between the actual installation state of DIMMs and the DIMM installation candidate pattern having the minimum difference in the DIMM installation count, and notifies incorrect installation and installation inadequacy of DIMMs.

In this way, the DIMM installation candidate pattern to be treated as the comparison target for the detection and display of incorrect installation and installation inadequacy can be selected according to various methods. Thus, even when the selection method according to the second embodiment is implemented, the operator can be properly notified about incorrect installation and installation inadequacy of DIMMs.

[c] Third Embodiment

Given below is the explanation of a third embodiment. Regarding the installation state detection display unit 10 according to the third embodiment too, the block diagram illustrated in FIG. 3 is referred to. In the third embodiment, the installation state determining unit 104 and the detection result display processing unit 105 that are implemented using hardware circuitry in the first embodiment are implemented using a multi-processing unit (MPU).

Figure 22:
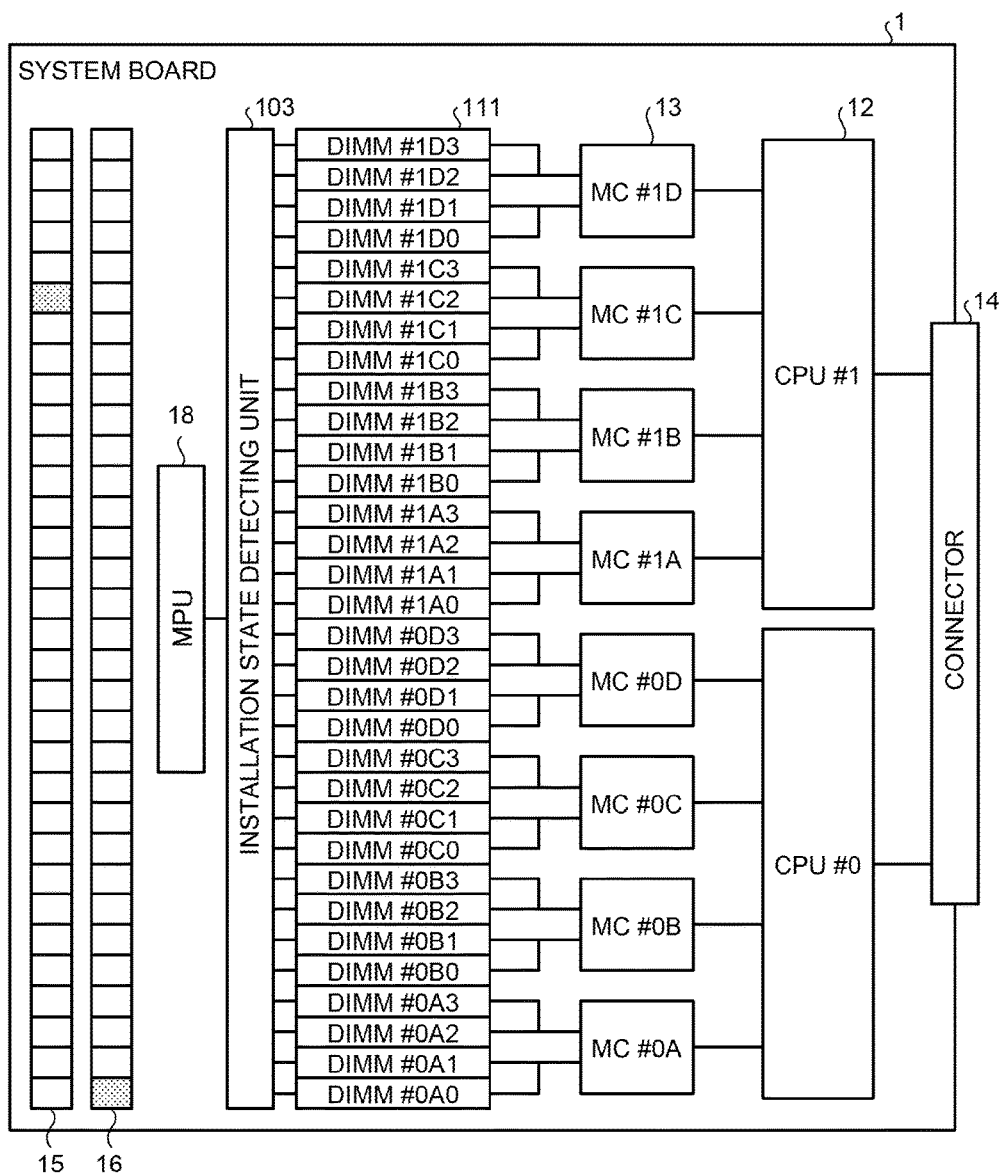
FIG. 22 is a configuration diagram of the system board according to a third embodiment.

FIG. 22 is a configuration diagram of the system board according to the third embodiment. The system board 1 according to the third embodiment includes the DIMM slots 111, the CPUs 12, the memory controllers 13, the connector 14, the installation state detecting unit 103, and a MPU 18.

The installation state detecting unit 103 has an identical configuration to the configuration illustrated in FIG. 13 according to the first embodiment.

The MPU 18 stores therein various computer programs that implement the functions of the installation state determining unit 104 and the detection result display processing unit 105. The MPU 18 executes the various computer programs stored therein, and implements the functions of the installation state determining unit 104 and the detection result display processing unit 105.

For example, the MPU 18 receives, from the installation state detecting unit 103, input of the detection result on the installation state of the DIMMs 11 in the DIMM slots 111.

Then, the MPU 18 executes various computer programs and implements the function of receiving the DIMM installation mode from the mode deciding unit 101 and obtaining the DIMM installation candidate pattern corresponding to the received DIMM installation mode from the pattern storing unit 102.

Subsequently, the MPU 18 executes various computer programs and implements the function of detecting incorrect installation and installation inadequacy based on the DIMM installation candidate pattern and the detection result on the installation state of the DIMMs 11, and displaying the detected incorrect installation and installation inadequacy on the display unit 106.

Meanwhile, in the third embodiment, the explanation is given about an example in which the MPU 18 executes computer programs and implements the functions of the installation state determining unit 104 and the detection result display processing unit 105. However, the execution of the computer programs is not limited to the use of a MPU. Alternatively, for example, it is possible to use a field programmable gate array (FPGA).

In this way, the functions of the installation state detection display unit 10 are implemented using the installation state detecting unit 103 and the MPU 18.

As described above, the information processing device according to the third embodiment implements the function of the installation state determining unit and the detection result display processing unit by executing predetermined computer programs. In this way, when the functions are implemented by executing computer programs, detailed processing can be set in tune with the operations, and the method of detection and display processing can be properly selected.

[d] Fourth Embodiment

Given below is the explanation of a fourth embodiment. Unlike in the first embodiment, the information processing device according to the fourth embodiment detects incorrect installation and installation inadequacy for peripheral component interconnect (PCI) devices.

Figure 23:
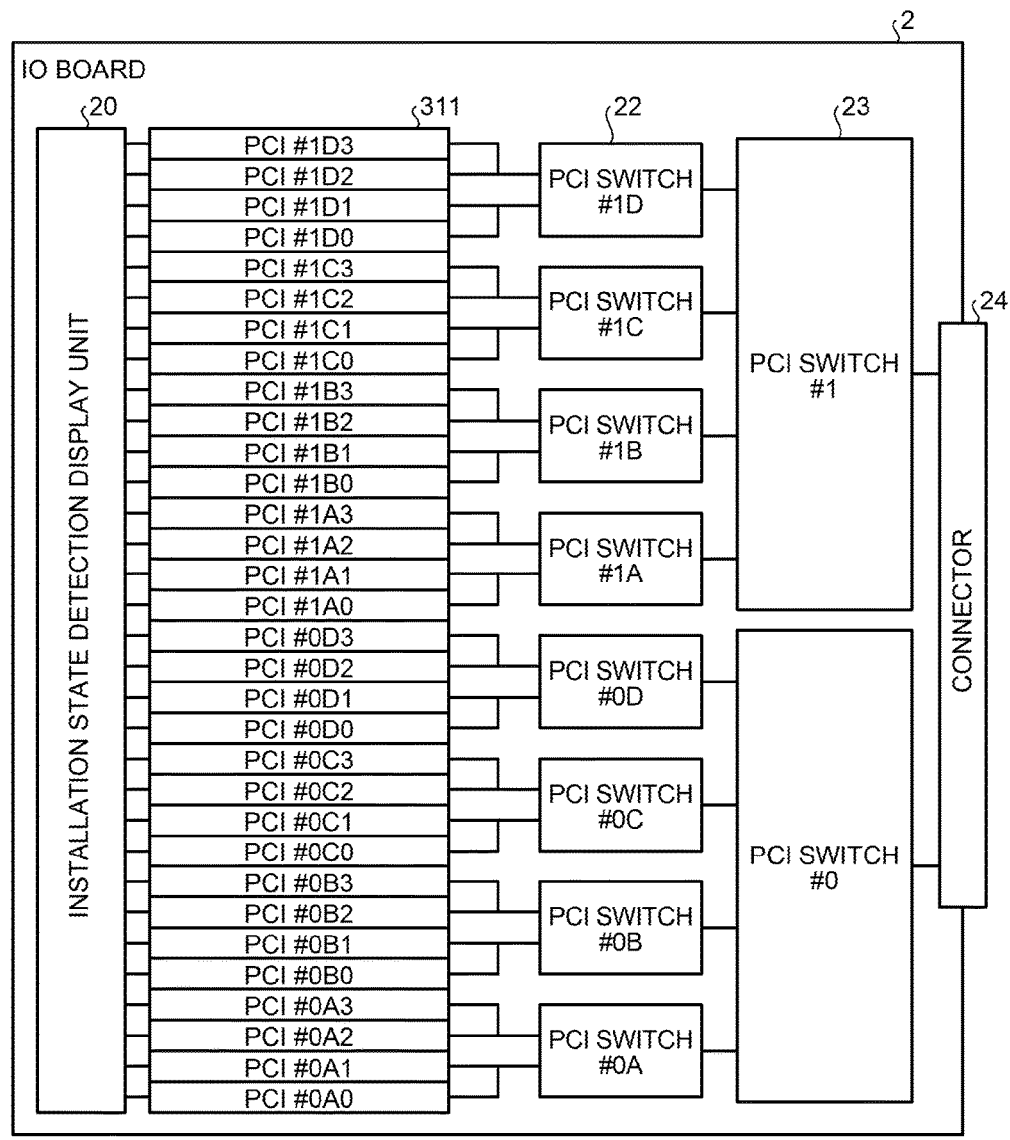
FIG. 23 is a configuration diagram of an IO board according to a fourth embodiment.

FIG. 23 is a configuration diagram of an IO board according to the fourth embodiment. The IO board 2 according to the fourth embodiment includes an installation state detection display unit 20, PCI slots 311, PCI switches 22, and PCI switches 23.

In the PCI slots 311, PCI devices 21 are installed. The PCI switches 22 are first-stage PCI switches connected to the PCI slots 311. The PCI switches 23 are second-stage switches that are connected to the PCI switches 22 and that perform data communication with a connector 24.

Figures 24, 25:
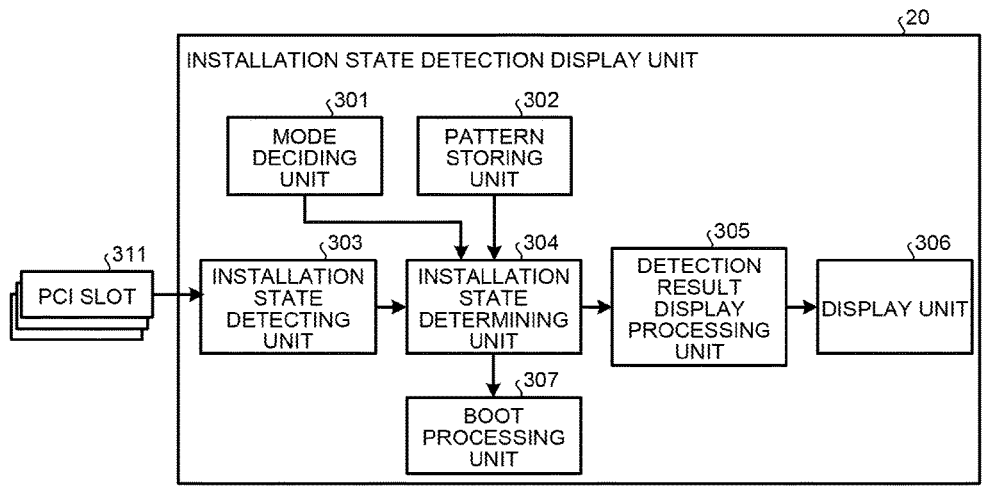
FIG. 24 is a block diagram of the installation state detection display unit according to the fourth embodiment.
FIG. 25 is a diagram illustrating an example of a PCI mode decision table.

The installation state detection display unit 20 according to the fourth embodiment is illustrated in a block diagram in FIG. 24. Herein, FIG. 24 is a block diagram of the installation state detection display unit according to the fourth embodiment. Regarding the constituent elements illustrated in FIG. 24, the functions with respect to DIMMs are implemented using PCIs instead of the constituent elements illustrated in FIG. 3.

A mode deciding unit 301 stores therein a PCI mode decision table 310 illustrated in FIG. 25. Herein, FIG. 25 is a diagram illustrating an example of the PCI mode decision table. In the PCI mode decision table 310, information about PCI installation modes is registered in response to combinations of PCI switch installation count, PCI installation type, and PCI operation mode.

The PCI switch installation count represents the number of second-stage PCI switches 23 that are installed. The PCI installation type represents the standard of the installed PCI devices 21. Herein, Gen2 (Gen stands for Generation) represents the PCI Express 2.0 standard. Moreover, Gen3 represents the PCI Express 3.0 standard. The PCI operation mode includes, for example, a bus mode and a segment mode.

The mode deciding unit 301 receives specification about the number, the PCI installation type, and the PCI operation mode of the PCI switches 23 installed in the information processing device 100; decides the corresponding PCI installation mode; and notifies an installation state determining unit 304 about the PCI installation mode.

A pattern storing unit 302 is used to store a PCI installation candidate pattern corresponding to each PCI operation mode.

An installation state detecting unit 303 detects the installation state of PCIs in the PCI slots 311.

The installation state determining unit 304 obtains PCI installation candidate patterns corresponding to the PCI installation mode obtained from the mode deciding unit 301. Then, the installation state determining unit 304 compares each PCI installation candidate pattern with the current installation state of the PCI devices 21, and detects incorrect installation and installation inadequacy of the PCI devices 21 for the concerned PCI installation candidate pattern. If there is no incorrect installation and installation inadequacy, then the installation state determining unit 304 outputs a system boot permission signal to a boot processing unit 307.

A detection result display processing unit 305 obtains the detection result of incorrect installation and installation inadequacy for each PCI installation candidate pattern from the installation state determining unit 304. Then, the detection result display processing unit 305 decides on the to-be-displayed detection result on incorrect installation and installation inadequacy, and displays the decided detection result on a display unit 306.

As described above, the information processing device according to the fourth embodiment detects the incorrect installation and installation inadequacy of PCI devices before the booting of the system, and notifies the operator about the detection result. As a result, the operator can promptly find incorrect installation and installation inadequacy of PCI devices, and thus can take measures in an expeditious manner. That enables achieving reduction in the man-hours of the operator while building the system as well as operating and maintaining the PCI devices.

Meanwhile, in the explanation given above, the example of detecting incorrect installation and installation inadequacy of DIMMs and the example of detecting incorrect installation and installation adequacy of PCI devices are explained separately. However, the two examples can also be combined together.

According to an aspect of an information processing device and a computer-readable recording medium disclosed in the application concerned, it becomes possible to reduce the man-hours of the operator.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
 a processor, a plurality of slots provided for installation of an electronic component, and a plurality of arithmetic processors; wherein
 the processor that executes a process including:
 first detecting presence or absence of installation of the electronic component in each of the slots;
 deciding on an installation candidate pattern based on a number of arithmetic processors, a type of the electronic component, and an operation mode of the electronic component;
 second detecting, based on detection result obtained by the first detecting and based on the installation candidate pattern indicating presence or absence of installation of an electronic component in each of the slots as determined based on configuration of the information processing device, an installation defect of the electronic component; and
 notifying, when the installation defect is detected by the second detecting, the installation detect.

2. The information processing device according to claim 1, further comprising a memory that is used to store the installation candidate pattern in a corresponding manner to configuration of the information processing device, wherein the processor obtains, from the memory, the installation candidate pattern based on configuration of the information processing device.

3. The information processing device according to claim 1, wherein the second detecting includes:
when the electronic component has been inserted in a slot other than a slot specified in the installation candidate pattern, detecting erroneous insertion as the installation defect, and
when the electronic component has not been inserted in a slot specified in the installation candidate patter, detecting insertion inadequacy as the installation defect.

4. The information processing device according to claim 1, further comprising a plurality of processors, wherein the electronic component is a DIMM.

5. The information processing device according to claim 1, wherein the process further includes;
selecting, from among installation candidate patterns in which a defect is detected, an installation candidate pattern having smallest number of nonmatching portions with detection result obtained by the first detecting, and
notifying an installation defect detected based on the selected installation candidate pattern and the detection result obtained by the first detecting.

6. The information processing device according to claim 1, wherein the process further includes:
selecting, from among installation candidate patterns in which a defect is detected, an installation candidate pattern having minimum difference between detection result obtained by the first detecting and installation count of the electronic component, and
notifying an installation defect detected based on the selected installation candidate pattern and the detection result obtained by the first detecting.

7. The information processing device according to claim 1, wherein the process further includes booting the information processing device when the installation candidate pattern in which the installation defect is not detected by the second detecting is present.

8. A computer-readable recording medium having stored therein an information processing device control program that causes a computer to execute a process comprising:
detecting presence or absence of installation of an electronic component in each of a plurality of slots provided for installation of the electronic component;
deciding on an installation candidate pattern based on a number of arithmetic processors, a type of the electronic component, and an operation mode of the electronic component;
detecting, based on detection result on presence or absence of installation of the electronic component and based on the installation candidate pattern indicating presence or absence of installation of an electronic component in each of the slots as determined based on configuration of concerned device, an installation defect of the electronic component; and
notifying the installation defect.

\* \* \* \* \*